United States Patent
Park

(10) Patent No.: US 7,903,513 B2
(45) Date of Patent: Mar. 8, 2011

(54) METHOD AND APPARATUS FOR CLOSING A RECORDING RANGE ON A RECORDING MEDIUM

(75) Inventor: Yong Cheol Park, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 12/085,755

(22) PCT Filed: Dec. 4, 2006

(86) PCT No.: PCT/KR2006/005176
§ 371 (c)(1),
(2), (4) Date: May 30, 2008

(87) PCT Pub. No.: WO2007/064177
PCT Pub. Date: Jun. 7, 2007

(65) Prior Publication Data
US 2010/0226220 A1    Sep. 9, 2010

Related U.S. Application Data

(60) Provisional application No. 60/741,481, filed on Dec. 2, 2005, provisional application No. 60/771,031, filed on Feb. 8, 2006.

(30) Foreign Application Priority Data

| Feb. 20, 2006 | (KR) | .................. 10-2006-0016468 |
| Apr. 26, 2006 | (KR) | .................. 10-2006-0037630 |
| Apr. 26, 2006 | (KR) | .................. 10-2006-0037631 |
| May 2, 2006 | (KR) | .................. 10-2006-0039498 |

(51) Int. Cl.
*G11B 27/36*    (2006.01)

(52) U.S. Cl. ...................................... 369/53.2; 369/53.24
(58) Field of Classification Search ................. 369/53.2, 369/53.24, 53.31
See application file for complete search history.

(56) References Cited

U.S. PATENT DOCUMENTS

| 4,558,446 A | 12/1985 | Banda et al. |
| 4,733,386 A | 3/1988 | Shimoi |
| 4,807,205 A | 2/1989 | Picard |
| 4,963,866 A | 10/1990 | Duncan |
| 5,068,842 A | 11/1991 | Naito |
| 5,111,444 A | 5/1992 | Fukushima et al. |
| 5,210,734 A | 5/1993 | Sakurai |

(Continued)

FOREIGN PATENT DOCUMENTS

CN    1134017    10/1996

(Continued)

OTHER PUBLICATIONS

Office Action for Japanese Application No. 2006-535262 dated Dec. 12, 2008.

(Continued)

*Primary Examiner* — Thang V Tran
(74) *Attorney, Agent, or Firm* — Harness, Dickey & Pierce, P.L.C.

(57) ABSTRACT

A method of closing a recording range includes identifying a recording medium type from recording medium information of the recording medium and changing and an unrecorded area in the recording range to a recorded area if the recording medium type indicates that the recorded area has a higher reflectivity than that of the unrecorded area.

18 Claims, 23 Drawing Sheets

U.S. PATENT DOCUMENTS

| | | | |
|---|---|---|---|
| 5,235,585 | A | 8/1993 | Bish et al. |
| 5,237,553 | A | 8/1993 | Fukushima et al. |
| 5,247,494 | A | 9/1993 | Ohno et al. |
| 5,319,626 | A | 6/1994 | Ozaki et al. |
| 5,404,357 | A | 4/1995 | Ito et al. |
| 5,442,611 | A | 8/1995 | Hosaka |
| 5,448,728 | A | 9/1995 | Takano et al. |
| 5,475,820 | A | 12/1995 | Natrasevschi et al. |
| 5,481,519 | A | 1/1996 | Hosoya |
| 5,495,466 | A | 2/1996 | Dohmeier et al. |
| 5,528,571 | A | 6/1996 | Funahashi et al. |
| 5,553,045 | A | 9/1996 | Obata |
| 5,577,194 | A | 11/1996 | Wells et al. |
| 5,608,715 | A | 3/1997 | Yokogawa et al. |
| 5,715,221 | A | 2/1998 | Ito et al. |
| 5,720,030 | A | 2/1998 | Kamihara et al. |
| 5,740,435 | A | 4/1998 | Yamamoto et al. |
| 5,745,444 | A | 4/1998 | Ichikawa et al. |
| 5,799,212 | A | 8/1998 | Ohmori |
| 5,802,028 | A | 9/1998 | Igarashi |
| 5,805,536 | A | 9/1998 | Gage et al. |
| 5,848,038 | A | 12/1998 | Igarashi |
| 5,867,455 | A | 2/1999 | Miyamoto et al. |
| 5,878,020 | A | 3/1999 | Takahashi |
| 5,914,928 | A | 6/1999 | Takahashi |
| 5,940,702 | A | 8/1999 | Sakao |
| 6,058,085 | A | 5/2000 | Obata |
| 6,118,608 | A | 9/2000 | Kakihara et al. |
| 6,138,203 | A | 10/2000 | Inokuchi et al. |
| 6,160,778 | A | 12/2000 | Ito et al. |
| 6,189,118 | B1 | 2/2001 | Sasaki et al. |
| 6,233,654 | B1 | 5/2001 | Aoki et al. |
| 6,292,445 | B1 | 9/2001 | Ito et al. |
| 6,341,109 | B1 | 1/2002 | Kayanuma |
| 6,341,278 | B1 | 1/2002 | Yamamoto et al. |
| 6,373,800 | B1 | 4/2002 | Takahasi |
| 6,405,332 | B1 | 6/2002 | Bando et al. |
| 6,414,923 | B1 | 7/2002 | Park et al. |
| 6,447,126 | B1 | 9/2002 | Hornbeck |
| 6,466,532 | B1 | 10/2002 | Ko |
| 6,469,978 | B1 | 10/2002 | Ohata et al. |
| 6,477,126 | B1 | 11/2002 | Park et al. |
| 6,480,446 | B1 | 11/2002 | Ko |
| 6,493,301 | B1 | 12/2002 | Park |
| 6,496,807 | B1 | 12/2002 | Inokuchi et al. |
| 6,529,458 | B1 | 3/2003 | Shin |
| 6,542,450 | B1 | 4/2003 | Park |
| 6,564,345 | B1 | 5/2003 | Kim et al. |
| 6,581,167 | B1 | 6/2003 | Gotoh et al. |
| 6,606,285 | B1 * | 8/2003 | Ijtsma et al. ............... 369/53.15 |
| 6,615,363 | B1 | 9/2003 | Fukasawa |
| 6,631,106 | B1 | 10/2003 | Numata et al. |
| 6,633,724 | B1 | 10/2003 | Hasegawa et al. |
| 6,667,939 | B1 | 12/2003 | Miyamoto |
| 6,671,249 | B2 | 12/2003 | Horie |
| 6,697,306 | B2 | 2/2004 | Sako |
| 6,714,502 | B2 | 3/2004 | Ko et al. |
| 6,724,701 | B2 | 4/2004 | Ijtsma et al. |
| 6,738,341 | B2 | 5/2004 | Ohata et al. |
| 6,754,860 | B2 | 6/2004 | Kim et al. |
| 6,760,288 | B2 | 7/2004 | Ijtsma et al. |
| 6,763,429 | B1 | 7/2004 | Hirayama |
| 6,766,418 | B1 | 7/2004 | Alexander et al. |
| 6,785,206 | B1 | 8/2004 | Lee et al. |
| 6,785,219 | B1 * | 8/2004 | Sasaki et al. ............... 369/47.15 |
| 6,788,631 | B1 | 9/2004 | Park et al. |
| 6,795,389 | B1 | 9/2004 | Nishiuchi et al. |
| 6,804,797 | B2 | 10/2004 | Ko et al. |
| 6,826,140 | B2 | 11/2004 | Brommer et al. |
| 6,842,580 | B1 | 1/2005 | Ueda et al. |
| 6,845,069 | B2 | 1/2005 | Nakahara et al. |
| 6,883,111 | B2 | 4/2005 | Yoshida et al. |
| 6,918,003 | B2 | 7/2005 | Sasaki |
| 6,934,236 | B2 | 8/2005 | Lee et al. |
| 6,999,398 | B2 | 2/2006 | Yamamoto et al. |
| 7,002,882 | B2 | 2/2006 | Takahashi |
| 7,027,059 | B2 | 4/2006 | Hux et al. |
| 7,027,373 | B2 | 4/2006 | Ueda et al. |
| 7,042,825 | B2 | 5/2006 | Yamamoto et al. |
| 7,050,701 | B1 | 5/2006 | Sasaki et al. |
| 7,092,334 | B2 | 8/2006 | Choi et al. |
| 7,123,556 | B2 | 10/2006 | Ueda et al. |
| 7,149,930 | B2 | 12/2006 | Ogawa et al. |
| 7,161,879 | B2 | 1/2007 | Hwang et al. |
| 7,184,377 | B2 | 2/2007 | Ito et al. |
| 7,188,271 | B2 | 3/2007 | Park et al. |
| 7,233,550 | B2 | 6/2007 | Park et al. |
| 7,236,687 | B2 | 6/2007 | Kato et al. |
| 7,248,541 | B2 * | 7/2007 | Yonezawa ............... 369/30.12 |
| 7,272,086 | B2 | 9/2007 | Hwang et al. |
| 7,289,404 | B2 | 10/2007 | Park et al. |
| 7,296,178 | B2 | 11/2007 | Yoshida et al. |
| 7,313,066 | B2 | 12/2007 | Hwang et al. |
| 7,327,654 | B2 | 2/2008 | Hwang et al. |
| 7,349,301 | B2 | 3/2008 | Terada et al. |
| 7,379,402 | B2 | 5/2008 | Ko et al. |
| 2001/0009537 | A1 | 7/2001 | Park |
| 2001/0011267 | A1 | 8/2001 | Kihara et al. |
| 2001/0026511 | A1 | 10/2001 | Ueda et al. |
| 2001/0043525 | A1 | 11/2001 | Ito et al. |
| 2002/0025138 | A1 | 2/2002 | Isobe et al. |
| 2002/0097665 | A1 | 7/2002 | Ko et al. |
| 2002/0097666 | A1 | 7/2002 | Ko et al. |
| 2002/0099950 | A1 | 7/2002 | Smith |
| 2002/0136118 | A1 | 9/2002 | Takahashi |
| 2002/0136134 | A1 | 9/2002 | Ito et al. |
| 2002/0136537 | A1 | 9/2002 | Takahashi |
| 2002/0159382 | A1 | 10/2002 | Ohata et al. |
| 2002/0161774 | A1 | 10/2002 | Tol et al. |
| 2002/0176341 | A1 | 11/2002 | Ko et al. |
| 2003/0072236 | A1 | 4/2003 | Hirotsune et al. |
| 2003/0095482 | A1 | 5/2003 | Hung et al. |
| 2003/0095484 | A1 * | 5/2003 | Motohashi ............... 369/53.24 |
| 2003/0126527 | A1 | 7/2003 | Kim et al. |
| 2003/0135800 | A1 | 7/2003 | Kim et al. |
| 2003/0137909 | A1 | 7/2003 | Ito et al. |
| 2003/0137910 | A1 | 7/2003 | Ueda et al. |
| 2003/0142608 | A1 | 7/2003 | Yamamoto et al. |
| 2003/0149918 | A1 | 8/2003 | Takaichi |
| 2003/0173669 | A1 | 9/2003 | Shau |
| 2003/0198155 | A1 | 10/2003 | Go et al. |
| 2004/0001408 | A1 | 1/2004 | Propps et al. |
| 2004/0004917 | A1 | 1/2004 | Lee |
| 2004/0062159 | A1 | 4/2004 | Park et al. |
| 2004/0062160 | A1 | 4/2004 | Park et al. |
| 2004/0076084 | A1 * | 4/2004 | Yonezawa ............... 369/53.24 |
| 2004/0076096 | A1 | 4/2004 | Hwang et al. |
| 2004/0105363 | A1 | 6/2004 | Ko et al. |
| 2004/0114474 | A1 | 6/2004 | Park et al. |
| 2004/0120233 | A1 | 6/2004 | Park et al. |
| 2004/0125716 | A1 | 7/2004 | Ko et al. |
| 2004/0125717 | A1 | 7/2004 | Ko et al. |
| 2004/0136292 | A1 | 7/2004 | Park et al. |
| 2004/0145980 | A1 | 7/2004 | Park et al. |
| 2004/0158768 | A1 | 8/2004 | Park et al. |
| 2004/0174782 | A1 | 9/2004 | Lee et al. |
| 2004/0174785 | A1 | 9/2004 | Ueda et al. |
| 2004/0179445 | A1 | 9/2004 | Park et al. |
| 2004/0179458 | A1 | 9/2004 | Hwang et al. |
| 2004/0193946 | A1 | 9/2004 | Park et al. |
| 2004/0223427 | A1 | 11/2004 | Kim et al. |
| 2004/0246851 | A1 | 12/2004 | Hwang et al. |
| 2005/0007910 | A1 | 1/2005 | Ito et al. |
| 2005/0008346 | A1 | 1/2005 | Noguchi et al. |
| 2005/0025007 | A1 | 2/2005 | Park |
| 2005/0047294 | A1 | 3/2005 | Park |
| 2005/0050402 | A1 | 3/2005 | Koda et al. |
| 2005/0052972 | A1 | 3/2005 | Park |
| 2005/0052973 | A1 | 3/2005 | Park |
| 2005/0055500 | A1 | 3/2005 | Park |
| 2005/0060489 | A1 | 3/2005 | Park |
| 2005/0068877 | A1 | 3/2005 | Yeo |
| 2005/0083740 | A1 | 4/2005 | Kobayashi |
| 2005/0083767 | A1 | 4/2005 | Terada et al. |
| 2005/0083830 | A1 | 4/2005 | Martens et al. |
| 2005/0195716 | A1 | 9/2005 | Ko et al. |
| 2005/0207262 | A1 | 9/2005 | Terada et al. |

| | | | | | | |
|---|---|---|---|---|---|---|
| 2005/0237875 A1* | 10/2005 | Yamanaka et al. ......... 369/47.53 | JP | 2001-357623 | 12/2001 | |
| 2005/0289389 A1 | 12/2005 | Yamagami et al. | JP | 2002-008247 | 1/2002 | |
| 2006/0039268 A1* | 2/2006 | Yamanaka ................ 369/275.1 | JP | 2002-015507 | 1/2002 | |
| 2006/0077827 A1 | 4/2006 | Takahashi | JP | 2002-015525 | 1/2002 | |
| 2006/0195719 A1 | 8/2006 | Ueda et al. | JP | 2002-056619 | 2/2002 | |
| 2006/0203635 A1 | 9/2006 | Ko et al. | JP | 2002-215612 | 8/2002 | |
| 2006/0203638 A1 | 9/2006 | Ko et al. | JP | 2002-245723 | 8/2002 | |
| 2006/0203684 A1 | 9/2006 | Ko et al. | JP | 2002-288938 | 10/2002 | |
| 2006/0227694 A1 | 10/2006 | Woerlee et al. | JP | 2002-329321 | 11/2002 | |
| 2007/0122124 A1 | 5/2007 | Park et al. | JP | 2002-352522 | 12/2002 | |
| 2007/0294571 A1 | 12/2007 | Park et al. | JP | 2003-151216 | 5/2003 | |
| 2008/0046780 A1 | 2/2008 | Shibuya et al. | JP | 2003-264800 | 9/2003 | |
| | | | JP | WO 2004/015708 | 2/2004 | |

FOREIGN PATENT DOCUMENTS

| | | | | | |
|---|---|---|---|---|---|
| CN | 1140897 | 1/1997 | JP | 2004-280864 | 10/2004 |
| CN | 1227950 | 9/1999 | JP | 2004-280865 | 10/2004 |
| CN | 1273419 | 11/2000 | JP | 2004-280866 | 10/2004 |
| CN | 1675708 | 9/2005 | JP | 2005-004912 | 1/2005 |
| CN | 1685426 | 10/2005 | KR | 10-2004-0094301 | 11/2004 |
| DE | 199 54 054 | 6/2000 | RU | 2208844 | 7/2003 |
| EP | 0 314 186 | 5/1989 | RU | 2005-127337 | 2/2006 |
| EP | 0 325 823 | 8/1989 | TW | 371752 | 10/1999 |
| EP | 0 350 920 | 1/1990 | TW | 413805 | 12/2000 |
| EP | 0 464 811 | 1/1992 | WO | WO 84/00628 | 2/1984 |
| EP | 0 472 484 | 2/1992 | WO | WO 96/30902 | 10/1996 |
| EP | 0 477 503 | 4/1992 | WO | WO 97/22182 | 6/1997 |
| EP | 0 556 046 | 8/1993 | WO | WO 00/54274 | 9/2000 |
| EP | 0 871 172 | 10/1998 | WO | WO 01/22416 | 3/2001 |
| EP | 0 908 882 | 4/1999 | WO | WO 01/93035 | 12/2001 |
| EP | 0 974 967 | 1/2000 | WO | WO 03/007296 | 1/2003 |
| EP | 0 989 554 | 3/2000 | WO | WO 03/025924 | 3/2003 |
| EP | 0997904 | 5/2000 | WO | WO 03/079353 | 9/2003 |
| EP | 1 026 681 | 8/2000 | WO | WO 03/095330 | 11/2003 |
| EP | 1 043 723 | 10/2000 | WO | WO 2004/015180 | 2/2004 |
| EP | 1 132 914 | 9/2001 | WO | WO 2004/015707 | 2/2004 |
| EP | 1 148 493 | 10/2001 | WO | WO 2004/025648 | 3/2004 |
| EP | 1 152 414 | 11/2001 | WO | WO 2004/025649 | 3/2004 |
| EP | 1 239 478 | 9/2002 | WO | WO 2004/029668 | 4/2004 |
| EP | 1 274 081 | 1/2003 | WO | WO 2004/029941 | 4/2004 |
| EP | 1 298 659 | 4/2003 | WO | WO 2004/029942 | 4/2004 |
| EP | 1 329 888 | 7/2003 | WO | WO 2004/034396 | 4/2004 |
| EP | 1 347 452 | 9/2003 | WO | WO 2004/036561 | 4/2004 |
| EP | WO 2004/059648 | 7/2004 | WO | WO 2004/053872 | 6/2004 |
| EP | 1 564 740 | 8/2005 | WO | WO 2004/053874 | 6/2004 |
| EP | 1 612 790 | 1/2006 | WO | WO 2004/068476 | 8/2004 |
| GB | 2 356 735 | 5/2001 | WO | WO 2004/075180 | 9/2004 |
| JP | 63-091842 | 4/1988 | WO | WO 2004/077415 | 9/2004 |
| JP | 01-263955 | 10/1989 | WO | WO 2004/077420 | 9/2004 |
| JP | 02-023417 | 1/1990 | WO | WO 2004/079631 | 9/2004 |
| JP | 05-274814 | 10/1993 | WO | WO 2004/079729 | 9/2004 |
| JP | 06-349201 | 12/1994 | WO | WO 2004/079730 | 9/2004 |
| JP | 7-121993 | 5/1995 | WO | WO 2004/079731 | 9/2004 |
| JP | 08-096522 | 4/1996 | WO | WO 2004/079740 | 9/2004 |
| JP | 09-145634 | 6/1997 | WO | WO 2004/081926 | 9/2004 |
| JP | 09-231053 | 9/1997 | WO | WO 2004/090890 | 10/2004 |
| JP | 9-320204 | 12/1997 | WO | WO 2004/093035 | 10/2004 |
| JP | 09-320204 | 12/1997 | WO | WO 2004/100155 | 11/2004 |
| JP | 10-050005 | 2/1998 | WO | WO 2004/100156 | 11/2004 |
| JP | 10-050032 | 2/1998 | WO | WO 2005/004123 | 1/2005 |
| JP | 10-187356 | 7/1998 | WO | WO 2005/004154 | 1/2005 |
| JP | 10-187357 | 7/1998 | WO | WO 2005/024792 | 3/2005 |
| JP | 10-187358 | 7/1998 | | | |
| JP | 10-187359 | 7/1998 | | | |
| JP | 10-187360 | 7/1998 | | | |
| JP | 10-187361 | 7/1998 | | | |
| JP | 11-110888 | 4/1999 | | | |
| JP | 11-203792 | 7/1999 | | | |
| JP | 2000-090588 | 3/2000 | | | |
| JP | 2000-149449 | 5/2000 | | | |
| JP | 2000-195178 | 7/2000 | | | |
| JP | 2000-215612 | 8/2000 | | | |
| JP | 2000-285607 | 10/2000 | | | |
| JP | 2000-339874 | 12/2000 | | | |
| JP | 2001-023317 | 1/2001 | | | |
| JP | 2001-069440 | 3/2001 | | | |
| JP | 2001-110168 | 4/2001 | | | |
| JP | 2001-351334 | 12/2001 | | | |

OTHER PUBLICATIONS

International Search Report PCT/ISA/210.
Written Opinion PCT/ISA/237.
Office Action for Russian Application No. 2006108000/28(008699) dated Feb. 5, 2009 and English translation thereof.
International Search Report for corresponding Application No. PCT/KR2004/002592 dated May 31, 2005.
Office Action for corresponding U.S. Appl. No. 10/967,142 dated Jan. 24, 2008.
Office Action for corresponding Taiwanese Application No. 93131256 dated Feb. 2, 2008.
Office Action for corresponding U.S. Appl. No. 10/967,142 dated Oct. 6, 2008.
"JIS Handbook Data Processing for Hardware," Japanese Standards Association Inc., Japan, Apr. 21, 1999, pp. 1064-1070.
European Search Report dated Aug. 14, 2009 issued in corresponding Application No. EP 04774796.9.

Russian Decision of Grant dated Oct. 8, 2009 issued in corresponding Application No. RU 2006-108000.
Office Action for corresponding Japanese Application No. 2006-535262 dated Jan. 26, 2010 and English language translation thereof.

Office Action for corresponding Chinese Application No. 200680045267.6 dated Jul. 14, 2010 and English translation thereof.

* cited by examiner

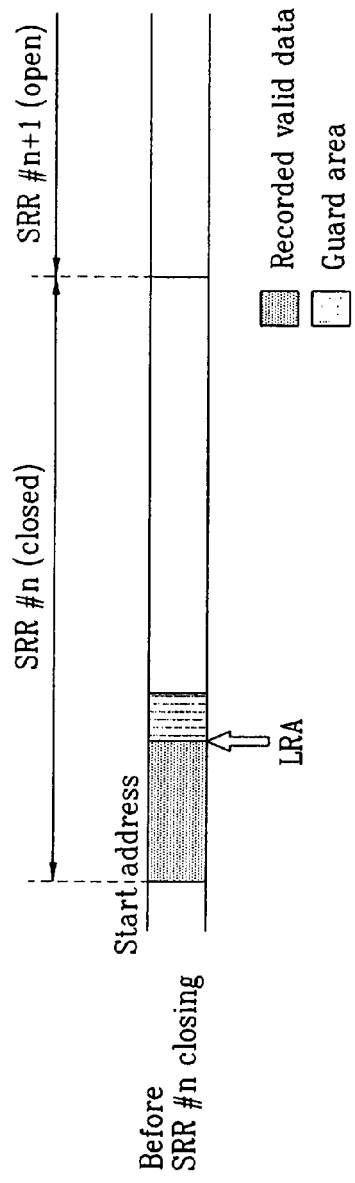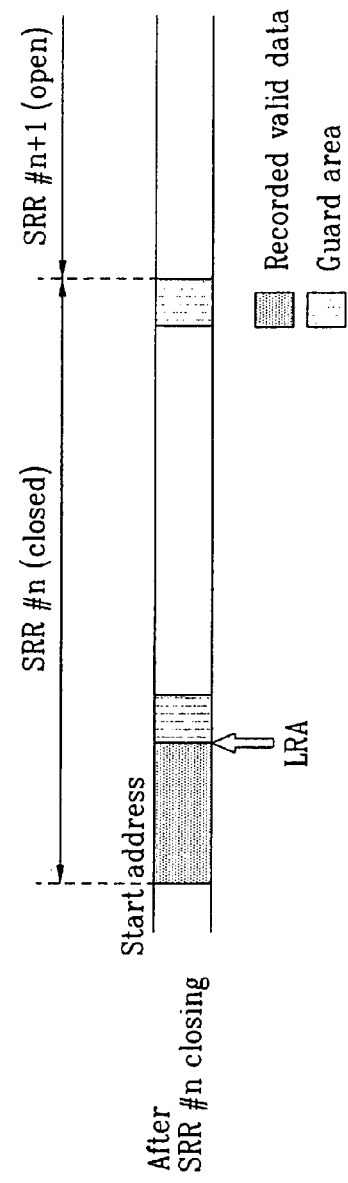

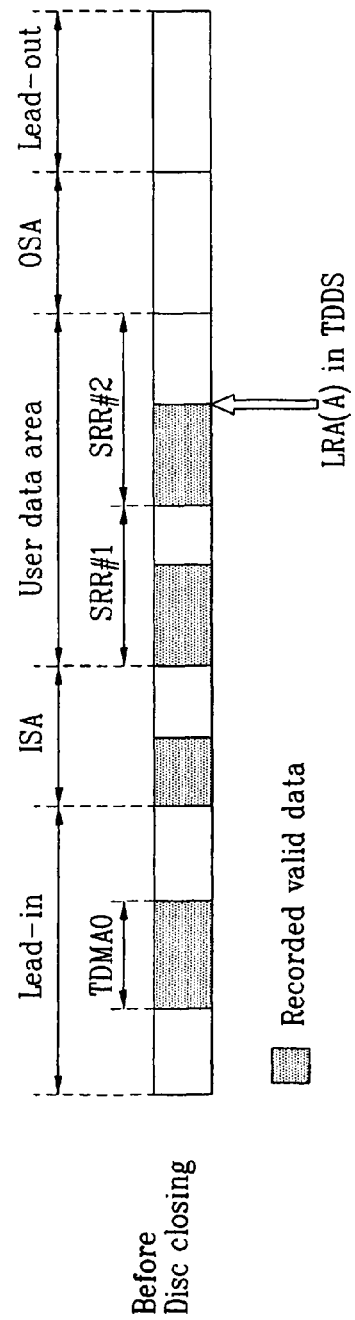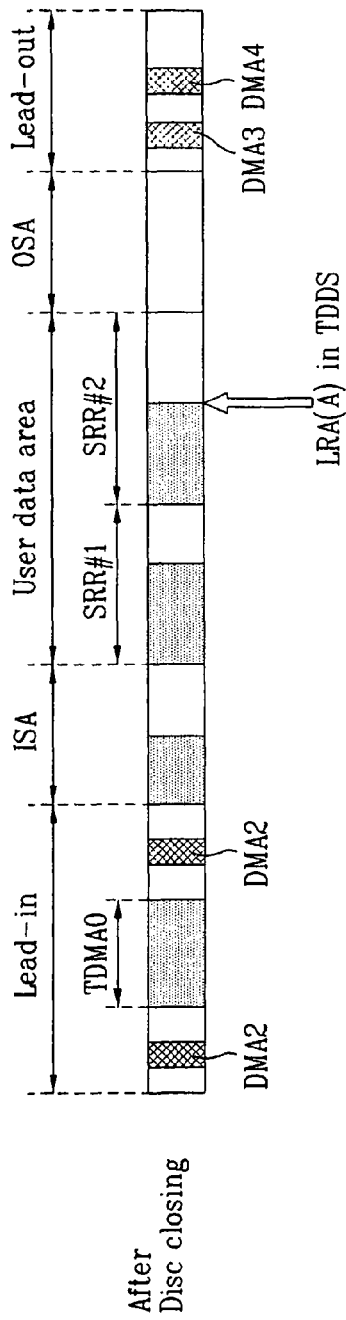

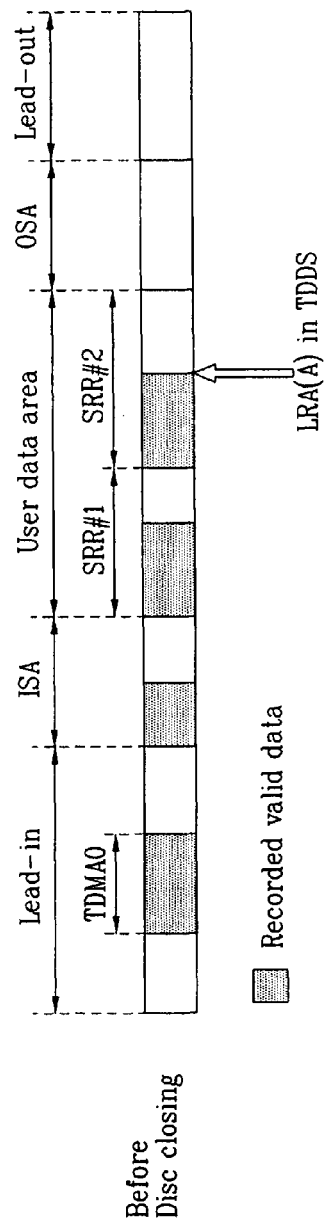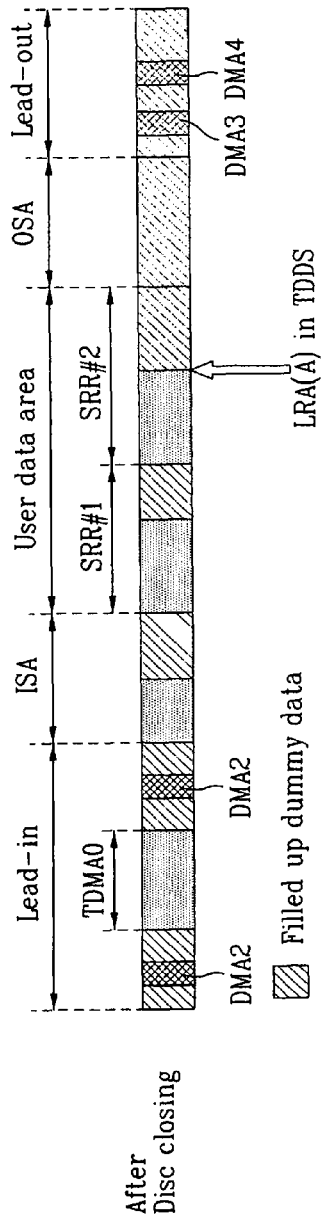

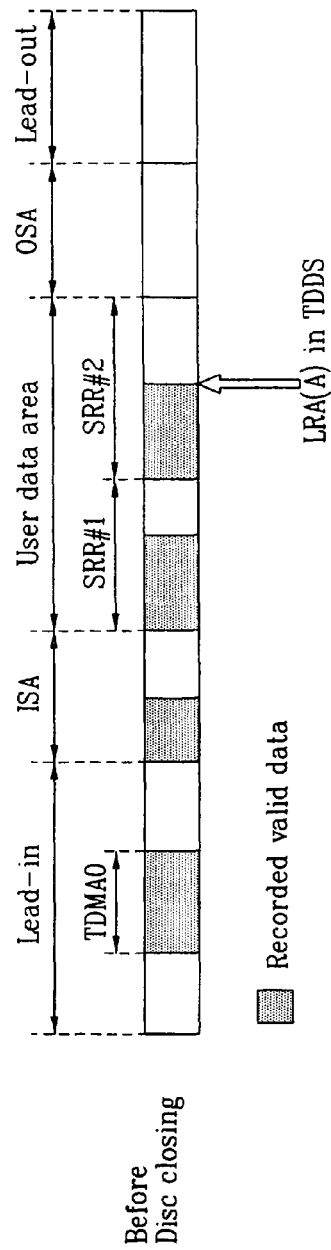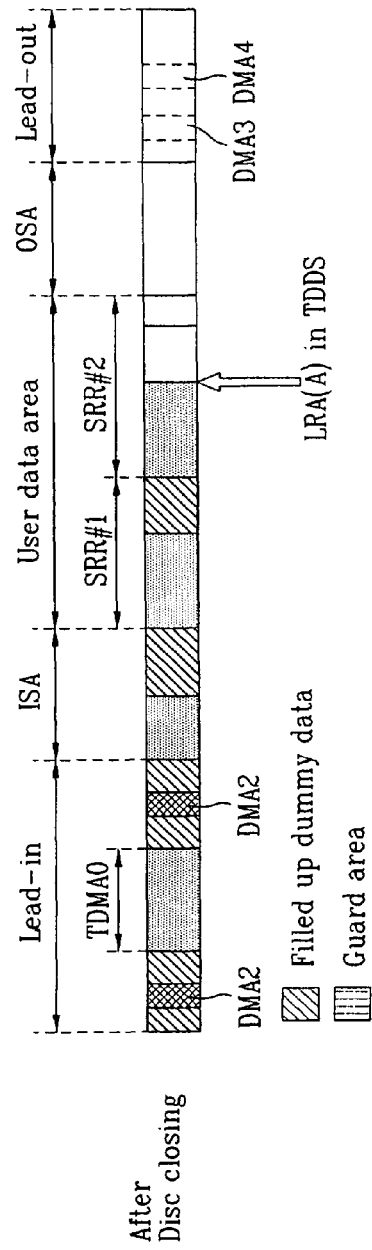

METHOD AND APPARATUS FOR CLOSING A RECORDING RANGE ON A RECORDING MEDIUM

This is application is National Phase entry of International Application number PCT/KR2006/005176 filed on Dec. 4, 2006, and claims priority under 35 U.S.C. §119 to U.S. Provisional Application Nos. 60/741,481, filed on Dec. 2, 2005, and 60/771,031, filed on Feb. 8, 2006 and Korean Applications KR10-2006-0016468, filed on Feb. 20, 2006, KR10-2006-0037630, filed on Apr. 26, 2006, KR10-2006-0037631, filed on Apr. 26, 2006, and KR 10-2006-0039498, filed on May 2, 2006, the entire contents of which is hereby incorporated.

TECHNICAL FIELD

The present invention relates to a recording medium, and more particularly, to a method and apparatus for efficiently recording/reproducing data on/from a recording medium.

BACKGROUND ART

Optical discs are widely used as recording media for recording a large quantity of data. Among such optical discs, new high density recording media such as a Blu-ray disc (BD) are under development, which enable long duration recording and storing of high definition video and audio data.

Currently, the BD, which is considered to be next generation recording medium technology as a data storing solution that significantly surpasses the existing DVD, is under development along with other digital apparatuses.

However, a preferred recording or reproducing method using the next generation high density optical recording medium such as the BD and more particularly a method of recording and managing management information corresponding to closing of a recording medium have not been suggested and thus there is a limitation to develop a BD-based optical recording/reproducing apparatus.

DISCLOSURE OF INVENTION

Accordingly, the present invention is directed to a method and apparatus for closing a recording range, a method and apparatus for closing a recording medium, a method and apparatus for recording management information, a method and apparatus for recording/reproducing data on/from a recording medium and a recording medium that substantially obviate one or more problems due to limitations and disadvantages of the related art.

An object of the present invention devised to solve the problem lies on a novel method and apparatus for recording/reproducing data on/from a recording medium, which is suitably used for a variety of recording media.

Another object of the present invention devised to solve the problem lies on a method and apparatus for recording management information related to closing of a recording medium in the recording medium.

Another object of the present invention devised to solve the problem lies on a method and apparatus for closing a recording medium.

Another object of the present invention devised to solve the problem lies on a recording medium to which the recording/reproducing method and/or the management information recording method are applied.

The object of the present invention can be achieved by providing a method of closing a recording range allocated in a user data area on a recording medium comprises: identifying a recording medium type from recording medium information of the recording medium; and changing an unrecorded area in the recording range to a recorded area in case that the recording medium type indicates that the recorded area has a higher reflectivity than that of the unrecorded area.

The method further can further comprise recording an indicator in a management area of the recording medium, the indicator indicating that the recording range does not include the unrecorded area.

In another aspect of the present invention, there is provided a method of closing at least one recording range allocated in a user data area on a recording medium, comprising: identifying a last recorded valid data point of the recording range; and recording recognition information next to the last recorded valid data point in the recording range, wherein the recognition information indicates that data before the recognition information is valid data lastly recorded in the recording range.

The method can further comprise recording the recognition information in an end portion of the recording range.

The recognition information can be recorded in a guard area formed next to the last recorded valid data point.

The recording medium has a higher reflectivity on a recorded area than a unrecorded area.

In another aspect of the present invention, there is provided an apparatus for closing a recording range allocated in a user data area on a recording medium, comprising: a pickup unit recording/reproducing data on/from the recording medium; and a control unit identifying a recording medium type from recording medium information of the recording medium and controlling the pickup unit to change an unrecorded area in the recording range to a recorded area in case that the recording medium type indicates that the recorded area has a higher reflectivity than that of the unrecorded area.

In another aspect of the present invention, there is provided an apparatus for closing a recording range allocated in a user data area on a recording medium, comprising: a pickup unit reading/recording data from/on the recording medium; and a control unit identifying a last recorded valid data point of the recording range and controlling the pickup unit to record recognition information next to the last recorded valid data point in the recording range.

In another aspect of the present invention, there is provided a method of recording management information on a recording medium, comprising: allocating at least one recording range in a user data area in the recording medium; and recording the management information in a management area of the recording medium, the management information including status information of the recording range, wherein the status information includes a first indicator indicating whether the recording range includes an unrecorded area.

The last recording range includes recognition information which indicates that data before the recognition information is valid data lastly recorded in the recording range.

In another aspect of the present invention, there is provided a method of closing a recording medium on which one or more recording ranges are allocated, comprising: forming a guard area in a last recording range, including valid data, in a user data area of the recording medium; and recording an indicator in a management area of the recording medium, wherein the indicator is used for identifying the last recording range in the recording medium.

In another aspect of the present invention, there is provided a recording medium comprising; a user data area in which at least one recording range is allocated; and a management area storing management information including status information of the recording range, wherein the status information includes a first indicator indicating whether the recording range includes an unrecorded area.

The status information can further include a second indicator indicating whether the recording range is a last recording range, including valid data, in the user data area.

In another aspect of the present invention, there is provided an apparatus for recording management information on a recording medium, comprising: a pickup unit recording/reproducing data on/from the recording medium; a control unit controlling the pickup unit to allocate at least one recording range in a user data area of the recording medium and controlling the pickup unit to record the management information including status information of the recording range in a management area of the recording medium, wherein the status information includes a first indicator whether the recording range includes an unrecorded area.

In another aspect of the present invention, there is provided an apparatus for closing a recording medium on which one or more recording ranges are allocated, comprising: a pickup unit recording/reproducing data on/from the recording medium; a control unit controlling the pickup unit to form a guard area in a last recording range, including valid data, in a user data area of the recording medium and controlling the pickup unit to record an indicator in a management area of the recording medium, wherein the indicator is used for identifying the last recording range in the recording medium.

In another aspect of the present invention, there is provided a method of closing a recording medium, comprising: changing an unrecorded area located before a last recorded user data point (A) to a recorded area, the last recorded user data point (A) indicating a last point, filled with user data, in the recording medium; and recording recognition information next to the last recorded valid data point (A), wherein the recognition information indicates that the recording medium is closed.

The recognition information can be recorded in a guard area formed next to the last recorded valid data point (A).

The guard area can be filled with dummy data as the recognition information.

The guard area can be filled with valid data as the recognition information.

In another aspect of the present invention, there is provided a method of closing a recording medium on which one or more recording ranges are allocated, the method comprising: changing an unrecorded area in the recording medium to a recorded area; and recording an indicator indicating that the recording medium is closed in management information of the recording medium.

The recording medium has a higher reflectivity on the recorded area than the unrecorded area.

In another aspect of the present invention, there is provided a method of closing a recording medium on which one or more recording ranges are allocated, comprising: determining a position in which recognition information is to be recorded; recording valid data located after the determined position into an unrecorded area before the guard area; and recording the recognition information in the determined position.

The method can further comprise recording managing information for the recorded valid data in a management area of the recording medium.

The valid data located after the determined position can be recorded into the unrecorded area by logical overwrite (LOW).

In another aspect of the present invention, there is provided a method of reproducing data from a recording medium, comprising: checking whether the recording medium is closed; and checking a last recorded valid data point in in a user data area of the recording medium, and reproducing data up to the last recorded valid data point in case that the recording medium is closed.

The last recorded valid data point can be checked by a guard area formed next to the last recorded valid data point.

In another aspect of the present invention, there is provided an apparatus for closing a recording medium including a user data area and a management area, comprising: a pickup unit recording/reproducing data on/from the recording medium; and a control unit controlling the pickup unit to change an unrecorded area, located before a last recorded valid data point (A) of the user data area, to a recorded area and controlling the pickup unit to record recognition information next to the last recorded valid data point (A), wherein the recognition information is used for identifying the last recorded valid data point (A) in the recording medium.

In another aspect of the present invention, there is provided an apparatus for closing a recording medium on which one or more recording ranges are allocated, comprising: a pickup unit recording/reproducing data on/from the recording medium; and a control unit determining a position in which recognition information is to be recorded, controlling the pickup unit to record valid data, located after the determined position, into an unrecorded area before the guard area, and controlling the pickup unit to record the recognition information in the determined position.

In another aspect of the present invention, there is provided an apparatus for recording/reproducing data on/from a recording medium, comprising: a pickup unit recording/reproducing the data on/from the recording medium; and a control unit checking whether the recording medium is closed, checking a last recorded valid data point in a user data area of the recording medium, and controlling the pickup unit to reproduce data up to the last recorded valid point in case that the recording medium is closed.

In another aspect of the present invention, there is provided a method of recording/reproducing data on/from a recording medium on which at least one recording range is allocated, comprising: checking whether an apparatus recording/reproducing the data on/from the recording medium is idle, and executing a closing process of the recording range in case that the apparatus is idle, wherein the closing process changes an unrecorded area in the recording range to a recorded area.

The method can further comprise, in case that an interruption occurs during executing the closing process, stopping the closing process and performing a command corresponding to the interruption.

The method can further comprise storing a last closing point, up to which the closing process has been executed in the recording range, when the closing process is stopped by the interruption.

The method can further comprise recording an indicator in a management area of the recording medium, wherein the indicator indicates the recording range on which the closing process is being executed when the closing process is stopped by the interruption.

In another aspect of the present invention, there is provided a recording medium, comprising: a user data area in which at least one recording range is allocated; and a management area in which management information is recorded, wherein the management information includes status information of the recording range, and the status information includes an indicator indicating whether the recording range is being closed while an apparatus recording/reproducing data on/from the recording medium is idle.

In another aspect of the present invention, there is provided an apparatus for recording/reproducing data on/from a recording medium on which at least one recording range is allocated, comprising: a pickup unit recording/reproducing the data on/from the recording medium; and a control unit controlling the pickup unit to execute a closing process of the recording range in case that the apparatus is idle, wherein the closing process changes an unrecorded area in the recording range to a recorded area.

The apparatus can further comprise a memory storing a last closing point, up to which the closing process has been executed in the recording range, when the closing process is stopped by the interruption.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 5A and 5B are diagrams illustrating another example of the method of closing the recording range according to the present invention;

FIGS. 7A and 7B are diagrams illustrating a first embodiment of the method of closing the recording medium according to the present invention;

FIGS. 8A and 8B are diagrams illustrating a second embodiment of the method of closing the recording medium according to the present invention;

FIGS. 9A and 9B are diagrams illustrating a third embodiment of the method of closing the recording medium according to the present invention;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Hereinafter, the term "recording medium" in the present invention includes all media on which data is recorded or will be recorded, such as an optical disc or a magnetic tape. For convenience of description and better understanding of the present invention, an optical disc, such as a BD, will hereinafter be exemplarily used as a recording medium in the present invention. It should be noted that technical ideas of the present invention are applicable to other recording mediums without departing from the scope and spirit of the invention.

The term "closing of a recording medium" in the present invention is indicative of a series of operations for using a recording medium as a read-only recording medium in case that data is no longer recorded on the recording medium. The term "closing" is also referred to as "finalization", which is widely used in a recordable-once optical disc.

The term "background close" in the present invention is indicative of an operation for changing an unrecorded area in a recording range allocated on a recording medium to a recorded area when a recording/reproducing apparatus (or system) is idle. The "idle" state of the recording/reproducing apparatus indicates that a pickup operation (FIGS. 9 and 11) of the recording/reproducing apparatus stops, that is, an operation for recording/reproducing data on/from the recording medium is not performed. Accordingly, the "background close" related to the present invention is performed in the idle state, which is automatically performed by the recording/reproducing apparatus (or system) using a predetermined method regardless of recognition of a user. Hereinafter, the detailed description thereof will be made later with reference to FIGS. 10c, 11c, 11d and 15.

Figure 1:
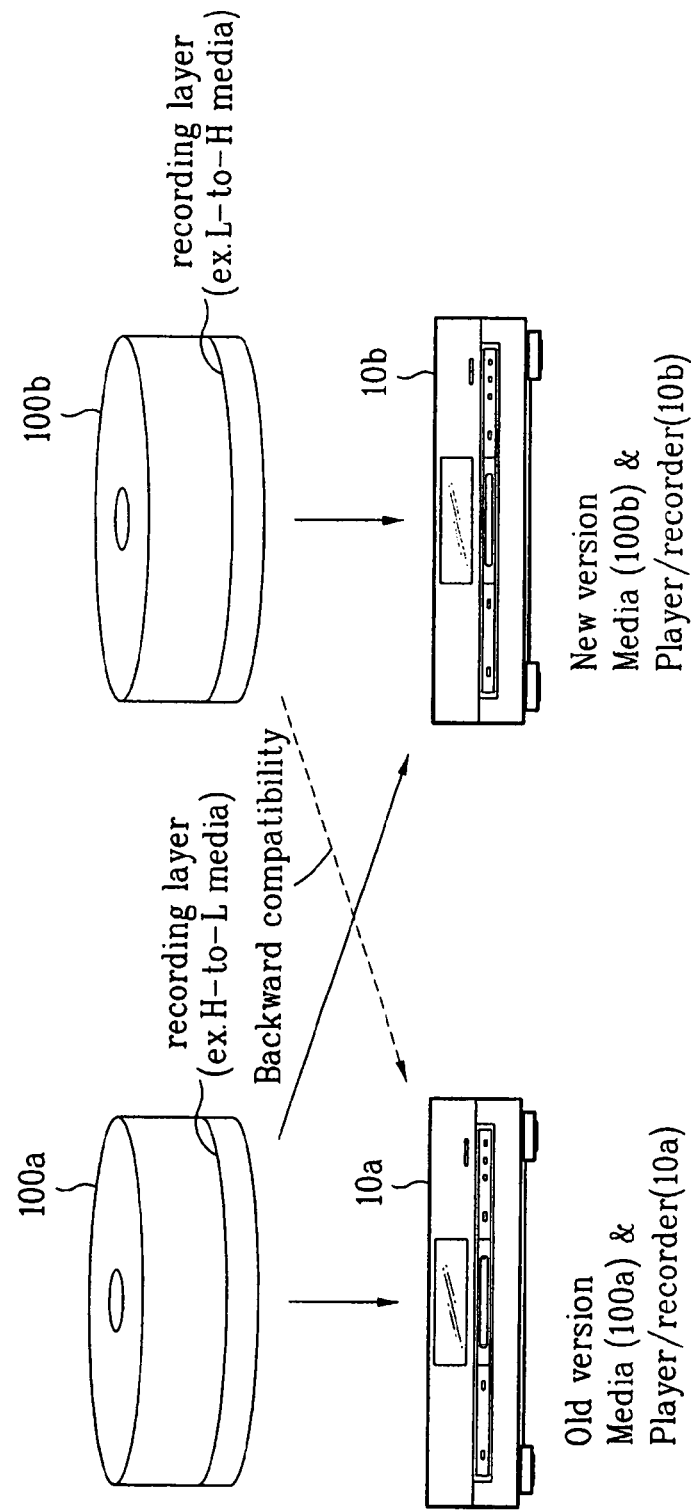
FIG. 1 is a conceptual diagram of the present invention.

FIG. 1 is a conceptual diagram showing a relationship between a recording medium and an apparatus for recording/reproducing data on the recording medium according to the present invention.

In general, a new version is continuously standardized in a new recording medium such as a BD. For example, an old version optical disc 100a is a medium in which reflectivity of a recorded area in which pits are formed is lower than that of an unrecorded area in which pits are not formed in the disc (also, referred to as "H-to-L media"). In contrast, a new version optical disc 100b is a medium in which reflectivity of a recorded area in which pits are formed is higher than that of an unrecorded area in which pits are not formed in the disc (also, referred to as "L-to-H media").

The types of the recording medium and characteristics of a push-pull signal are shown in Table 1.

TABLE 1

|  | Unrecorded area | Recorded area | Unrecorded area |
|---|---|---|---|
| H-to-L | H | L | H |
| P/P | L | H | L |
| L-to-H | L | H | L |
| P/P | H | L | H |

In the old version optical disc 100a, the reflectivity of the unrecorded area is higher than that of the recorded area. In contrast, in the new version optical disc 100b, the reflectivity of the unrecorded area is lower than that of the recorded area.

In the characteristics of the push-pull signal for generating a servo tracking signal, the push-pull level of the recorded area is lower than that of the unrecorded area in the new version optical disc 100b, and the push-pull level of the recorded area is higher than that of the unrecorded area in the old version optical disc 100a. That is, when it is assumed that the unrecorded area and the recorded area are mixed in the optical disc in the order shown in Table 1, the reflectivities of the respective areas are respectively H, L and H and the push-pull levels thereof are respectively L, H and L in the old version optical disc 100a. In contrast, in the new version optical disc 100b, the reflectivities of the respective areas are respectively L, H and L, and the push-pull levels thereof are respectively H, L and H.

In general, a suitable recording/reproducing apparatus (also referred to as a "player" or a "recorder") is developed in standardization. A recording/reproducing apparatus 10a corresponds to the old version optical disc 100a and a recording/reproducing apparatus 10b corresponds to the new version optical disc 100b. Accordingly, the recording/reproducing apparatus 10b is designed to record/reproduce data on/from the old version optical disc 100a as well as the new version optical version 100b. In contrast, the recording/reproducing apparatus 10a can record/reproduce data on/from only the old version optical disc 100a and cannot record/reproduce data on/from the new version optical disc 100b. This is because the standard on the new version optical disc 100b was not established when designing the recording/reproducing apparatus 10a.

Accordingly, in a step of standardizing the new version optical disc 100b, it is preferable that compatibility is maintained such that data can be reproduced even by the old version recording/reproducing apparatus 10a, which is also referred to as "backward compatibility".

For example, when the recorded area and the unrecorded area are mixed in the new version "L-to-H media" 100b, the recording/reproducing apparatus 10a does not recognize the reflectivity of the unrecorded area at the time of a seek operation and thus a focus servo operation is not performed. Accordingly, the reproduction of the new version "L-to-H media 100b" cannot be performed.

Accordingly, when the new version recording/reproducing apparatus 10b records data in the "L-to-H media" 100b or when the "L-to-H media" 100b is closed, the data needs to be continuously recorded from a start point such that the old version recording/reproducing apparatus 10a can also reproduce the data from the "L-to-H media" 100b. That is, the unrecorded area in the "L-to-H media" 100b needs to be changed to the recorded area.

Figure 2:
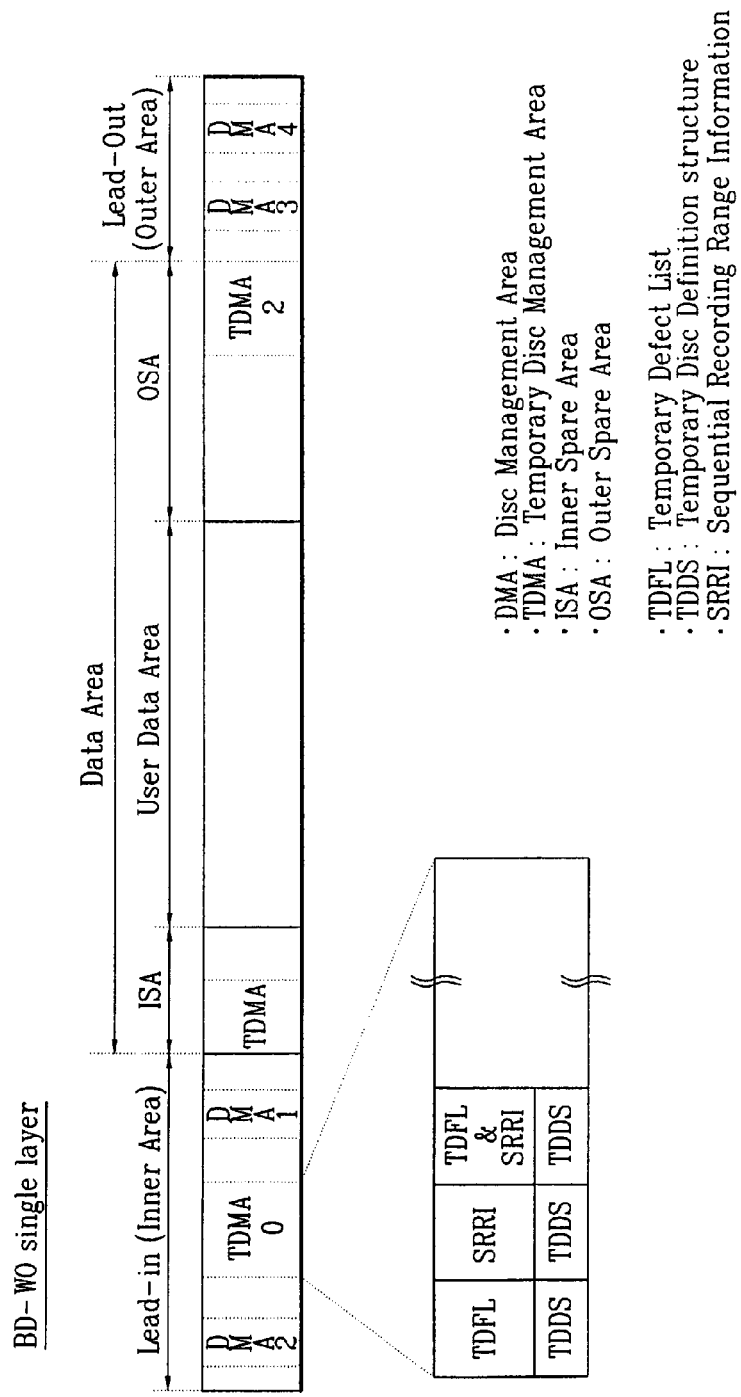
FIG. 2 is a diagram showing the structure of a recording medium according to the present invention.

FIG. 2 is a diagram showing the structure of the recording medium according to the present invention. For convenience of description, a Blu-ray disc-recordable (BD-R) is, for example, used as the recording medium.

For convenience of description, although a single layer disc having one recording layer is, for example, described in the following description, the present invention is not limited to the single layer disc and is applicable to a multi-layer disc having at least two recording layers.

The BD-R according to the present invention includes a Lead-in area, a data area and a Lead-out area from an inner circumference to an outer circumference. The data area includes a user data area for recording user data and an inner spare area (ISA) and an outer spare area (OSA) as a spare area for managing disc defect. The spare area may not be allocated if desired.

The BD-R includes a temporary disc management area (hereinafter, referred to as a "TDMA") for recording management information before closing the disc and a disc management area (hereinafter, referred to as a "DMA") for recording final management information at the time of closing the disc. The TDMA is included in the Lead-in area, the ISA and the OSA, and the DMA is included in the Lead-in area and the Lead-out area.

The TDMA and the DMA have the following relationship. In the characteristics of the BD-R, general management information indicating the recording state of the disc as well as defect management information which is generated during using the disc is mixed and recorded in the TDMA. Thereafter, after the disc is closed, data can be no longer recorded in the disc and thus the final management information in the TDMA is transferred to and recorded in the DMA during closing the disc. Accordingly, the management information is recorded in the TDMA when using the disc and the final information in the TDMA is transferred to and recorded in the DMA when closing the disc. Thereafter, the management information in the DMA is used to reproduce the data from the disc.

The TDMA is classified into two types: TDMA0 which has a fixed size (e.g., 2048 clusters) in the Lead-in area and is always allocated at the time of initialization of the disc, and TDMA1 and TDMA2 which are selectively allocated in the spare area with variable sizes. The TDMA is used in order of TDMA0, TDMA1 and TDMA2.

The bottom of FIG. 2 shows the type of the management information recorded in the TDMA of the BD-R. Although the same type of management information may be also recorded in the TDMA0 to TDMA2, only the management information which is recorded in the TDMA1 is shown in FIG. 2, for convenience of description.

The management information recorded in the TDMA includes a Temporary DeFect List (TDFL), sequential recording range information (SRRI), and a temporary disc definition structure (TDDS).

In particular, the TDFL includes positional information of a defective cluster which is generated in the disc and a replacement cluster for replacing the defective cluster. The SRRI includes an SRR entry per SRR allocated on the disc. The SRR entry includes status information per SRR allocated on the disc. In particular, the SRR and the SRR entry will be described in detail later. The TDDS includes general management information related to the disc structure and more particularly a pointer for specifying latest positions of the TDFL and the SRRI.

The SRRI is recorded only when a disc recording mode is a sequential recording mode (SRM). If the disc recording mode is a random recording mode (RRM), a space bit-map (SBM) may be recorded as other management information, instead of the SRRI. Although the SBM is not shown in FIG. 2, the technical ideas of the present invention are applicable to the RRM.

When the user data area or the TDMA in which the data is recorded no longer remains in the disc or when the user no longer wants to record data on the disc, the disc is closed. At this time, the final management information of the management information recorded in the TDMA is transferred to and recorded in the DMA.

Figure 3:
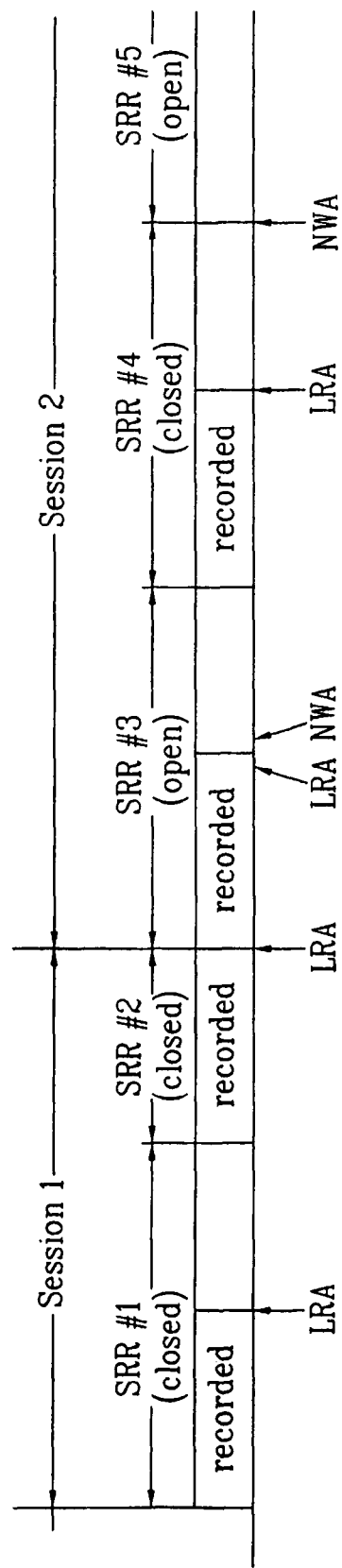
FIG. 3 is a diagram illustrating a method of recording data in a recording medium according to the present invention.

FIG. 3 is a diagram illustrating a method of recording the data in the recording medium according to the present invention. As described above, the present invention will be, for example, described using the BD-R.

The term "recording range" in the present invention is indicative of an area which is generated (allocated) so as to record data on the BD-R. As described above, the recording range is referred to as the SRR in the BD-R.

The SRR is classified into two types. First, a SRR including an unrecorded area, in which valid data can be further recorded, is referred to as an "open SRR". That is, the open SRR is indicative of a SRR including a next writable address (referred to as "NWA"). At most 16 open SRRs may be included in the entire BD-R. Accordingly, the recording/reproducing apparatus records data at the NWA of the open SRR which is generated in the disc. Next, a SRR in which valid data cannot be further recorded is referred to as a "closed SRR". That is, the closed SRR is indicative of a SRR which does not include the NWA. When an area in which data will be recorded is not included in the SRR or when an area in which data will be recorded is included in the SRR but the user does not want to record the data in the SRR, the open SRR is changed to the closed SRR. A method of changing the open SRR to the closed SRR will be described in detail later.

Hereinafter, a relationship between an example of the recording method using the SRR according to the present invention and a session will be described in detail.

The term "session" is indicative of a recording unit which includes at least one SRR and has a level higher than that of the SRR. In general, a plurality of sessions called multisession may be used in the optical disc. However, only a final session becomes a recordable session and all the previous sessions thereof are closed. Accordingly, all the SRRs included in the previous sessions are changed to the closed SRRs.

For example, a SRR #1 and a SRR #2 are allocated and recorded in Session 1 from a start point of the disc. Thereafter, Session 1 is closed and Session 2 is opened such that new recording starts. At this time, the SRR #1 and the SRR #2 included in Session 1 are changed to the closed SRRs such that the recordable open SRR is no longer included in Session 1.

Subsequently, when a SRR #3, a SRR #4 and a SRR #5 are allocated in Session 2, the SRR #3 to SRR #5 include recordable areas as the open SRRs. FIG. 3 shows a state after the data is recorded in a predetermined section, for description of the present invention. For example, valid data is recorded in the SRR #3 and the SRR #4 and the SRR #4 is forcedly changed to the closed SRR by a host or the user. That is, at least one open SRR may be included in Session 2 in which data can be recorded and all the SRRs are not necessarily the open SRRs.

A last recorded state of the disc shown in FIG. 3 can be checked by checking the SRRI recorded in the TDMA. That is, it can be checked that Session 2 is currently being used, the SRR #3 and the SRR #5 in Session 2 are the open SRRs and all the SRRs in Session 1 are the closed SRRs in which data is no longer recorded, by checking header information recorded in the SRRI and the SRR entry including an status information of the corresponding SRR. Each SRR entry has information on a last recorded address (LRA) for specifying a last position in which valid user data is recorded. In particular, the recording/reproducing apparatus determines the address of a first cluster after the LRA of the open SRR as the NWA and records data from the NWA. The entire structure of the SRR entry will be described in detail with reference to FIGS. 8a to 8d.

In the present invention, a method of closing the SRR varies depending on the type of the media such that the old version recording/reproducing apparatus 10a can reproduce the closed SRR. For example, when the type of the disc is the "H-to-L media" 100a, the SRR is closed using a method of removing the SRR entry from the open entry list of the SRRI. In contrast, when the type of the disc is the new version "L-to-H media" 100b, the SRR cannot be closed only using the method of removing the SRR entry from the open entry list of the SRRI. This is because the old version recording/reproducing apparatus 10a cannot recognize the data on the new version "L-to-H media" 100b and thus an error occurs. That is, the backward compatibility is not maintained.

Hereinafter, the method of closing the SRR such that the "L-to-H media" 100b maintains the backward compatibility with the old version recording/reproducing apparatus 10a will be described in detail with reference to FIGS. 4A to 5B.

Figure 4A:
FIGS. 4A and 4B are diagrams illustrating an example of a method of closing a recording range according to the present invention.
Figure 4B:
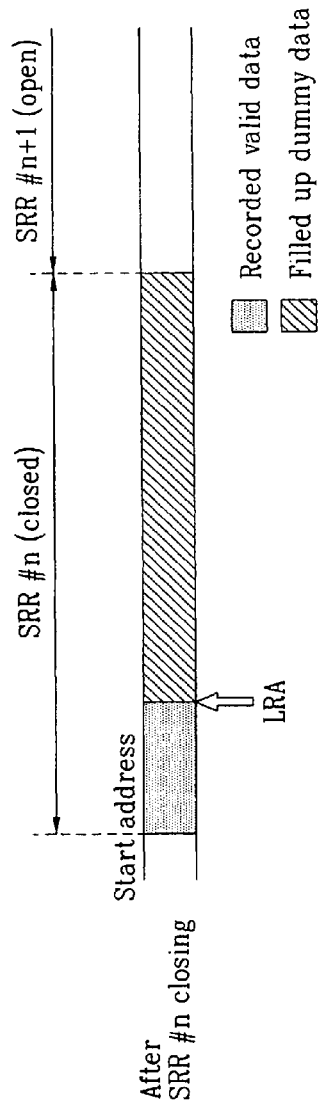

FIGS. 4A and 4B are diagrams illustrating an example of the method of closing the SRR according to the present invention. For convenience of description, FIG. 4A shows a disc state including a SRR #n before closing and FIG. 4B shows a disc state including the SRR #n after closing. A case where the SRR #n of the SRRs allocated in the user data area is closed will be, for example, described. The user data area of the disc shown in FIG. 4A includes an open SRR #n and an open SRR #n+1. The open SRR entry list of a latest SRRI in the TDMA which is being used in the disc includes the SRR #n and the SRR #n+1.

FIG. 4B shows the disc state after performing the method of closing the SRR according to the present invention. That is, in the example of the method of closing the SRR according to the present invention, the SRR #n is closed by forcedly closing all the unrecorded area in the SRR #n to the recorded area. For example, the new version recording/reproducing apparatus 10b closes the SRR #n by filling up dummy data from the LRA of the SRR #n and removing the SRR #n from the SRRI.

The SRR closing method shown in FIG. 4B is suitable for the new version disc 100b shown in FIG. 1. That is, all the unrecorded areas needs to be changed to the recorded areas such that the SRRs allocated in the new version disc 100b maintain the backward compatibility with the old version recording/reproducing apparatus 10a. The SRR closing method shown in FIG. 4B is applicable to the old version disc 100a shown in FIG. 1. This is because the data can be no longer recorded in the closed SRR and thus all the unrecorded areas may be changed to the recorded areas. That is, when the SRR allocated in the old version disc 100a shown in FIG. 1 is closed, both the method of removing the SRR from the open SRR entry list of the SRRI and the method shown in FIG. 4B can be used.

FIGS. 5A and 5B are diagrams illustrating other examples of the method of closing the SRR according to the present invention. For convenience of description, a case where the SRR #n of the SRRs allocated in the user data area is closed will be described.

In FIG. 5A, the SRR #n is closed by forming a guard area at a start portion of an unrecorded area of the SRR #n and recording recognition information in the guard area. The recognition information indicates that data before the recognition information is user data lastly recorded in the recording range.

The recognition information may include specific valid data recorded in the guard area or dummy data recorded in the guard area. The SRR #n is removed from the open SRR entry list in the TDMA, which is being used, so as to indicate that the SRR #n is not the open SRR.

Hereinafter, the "guard area" will be described in detail. The guard area is an area which can be recognized by the recording/reproducing apparatus and includes at least one recording unit (e.g., a cluster). That is, the guard area which can be recognized by the recording/reproducing apparatus may be formed by a variety of methods. For example, the recording/reproducing apparatus can recognize the guard area having a specific size (for example, n clusters: n>2) in which the recognition information (e.g., predetermined valid information or dummy data) is recorded.

FIG. 5B shows a modified example of FIG. 5A, in which guard areas are formed at a start portion and an end portion of the unrecorded area of the SRR #n and the recognition information is recorded in the guard areas.

When the size of the guard area(s) formed in the SRR #n is smaller than that of the unrecorded area in the SRR #n, the recognition information may be recorded in the whole unrecorded area in the SRR #n.

When the SRR to be closed is relatively large, it may take much time to change all the unrecorded area in the SRR to the recorded area. According to the SRR closing method described with reference to FIG. 5A, when only a portion of the SRR is changed to the recorded area, it is possible to reduce a time consumed for closing the SRR, compared with the method of changing the whole unrecorded area after the LRA of the SRR to the recorded area. When it is recognized that the guard area is included in the SRR #n, the old version recording/reproducing apparatus 10a can reproduce the data from the new version disc 100b with compatibility by reproducing only the data before the guard area while ignoring the data after the guard area. The existence of the guard area in the SRR #n can be checked by checking the SRR entry of FIGS. 11b and 11d to be described later.

Figure 6:
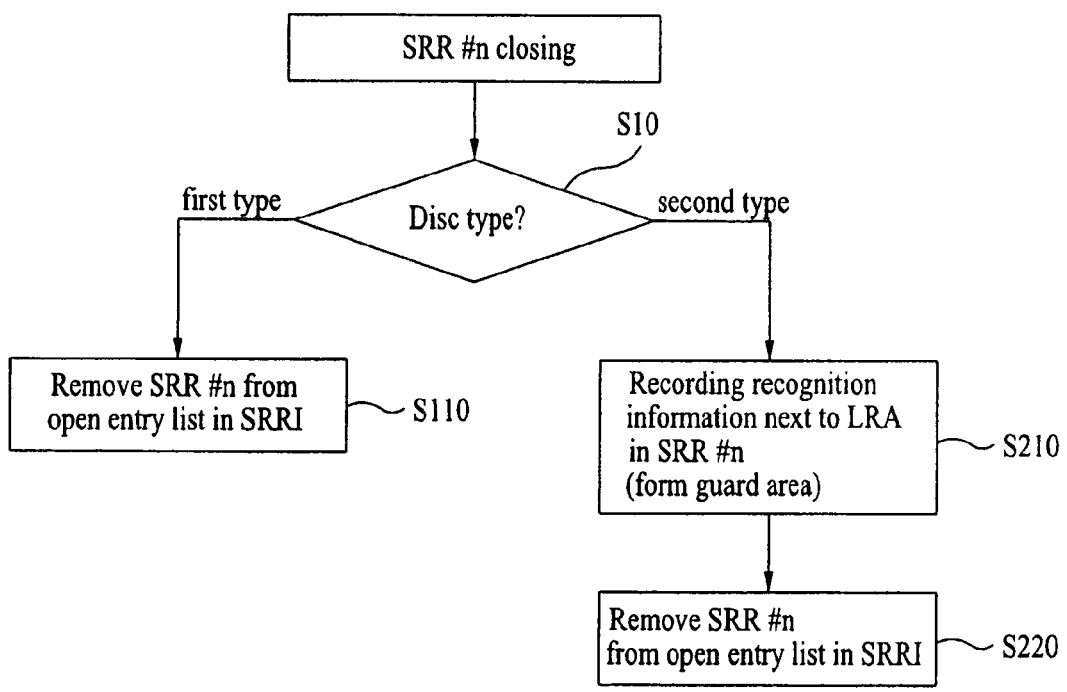
FIG. 6 is a flowchart illustrating a method of closing a sequential recording range (SRR)

FIG. 6 is a flowchart illustrating the method of closing the SRR according to the present invention, which includes the closing method described with reference to FIG. 5A.

When a command for closing the SRR allocated in the disc is received, the recording/reproducing apparatus according to the present invention checks which type of the disc is loaded (S10). The type of the disc is indicative of the type which is classified according to the reflectivity of the recording layer and can be identified by the management information recorded in the disc. For example, in the BD-R, the type of the disc can be identified by checking reflectivity information (e.g., a "push-pull polarity" field, a "recorded mark polarity" field or the like) of a pit recorded in disc information (DI). For example, when the "push-pull polarity" field is set to "0", the disc is the "H-to-L media" 100a and, when the "push-pull polarity" field is set to "1", the disc is the new version disc 100b. When the "recorded mark polarity" field is set to "0", the disc is the disc (for example, the "H-to-L media" 100a) in which the reflectivity of a recorded portion in the disc is lower than that of a unrecorded portion. When the "recorded mark polarity" field is set to "1", the disc is the disc (for example, the "L-to-H media" 100b) in which the reflectivity of the recorded portion in the disc is higher than that of the unrecorded portion.

The step S10 is not necessarily performed when the command for closing the SRR is received and may be performed by checking the management information in the disc just after the disc is loaded.

If the disc is of a first type (for example, the "H-to-L media" as the old version optical disc 100a shown in FIG. 1) as the result of checking the type of the disc, the SRR is removed from the open SRR entry list in the latest SRRI of the TDMA which is being used (S110). In addition, the recording/reproducing apparatus may optionally change the unrecorded area in the SRR to the recorded area.

If the disc is of a second type (for example, the "L-to-H media" as the new version optical disc 100b shown in FIG. 1), the guard area having a predetermined size is formed next to the LRA of the SRR and the recognition information is recorded in the guard area (S210) and the SRR is removed from the open SRR entry list in the latest SRRI of the TDMA which is being used in the disc (S220). The order of the steps S210 and 5220 may be changed.

It is apparent that the SRR closing methods shown in FIGS. 4A to 6 may be similarly used even when a session in the disc is closed.

According to the present invention, although the SRR or the session of the disc is closed as described above, the disc may be closed when the disc is only used as a disc for reproduction, in which the data is no longer recorded. Hereinafter, methods of closing a disc according to the present invention will be described.

FIGS. 7A and 7B are diagrams illustrating a first embodiment of a method of closing a recording medium according to the present invention. For convenience of description, FIG. 7A shows a disc state before closing and FIG. 7B shows a disc state after closing.

FIG. 7A shows a disc of which ISA and OSA does not include a TDMA. The SRR #1 and SRR #2 are allocated in the user data area and a last LRA (A) of the disc is a last position including user data in the SRR #2. The last LRA (A) of the disc is recorded in the above-described TDDS. The LRA of the SRR is separately recorded in each SRR entry in the SRRI.

FIG. 7B shows the disc state after closing the disc according to the first embodiment of the present invention. That is, according to the first embodiment of the present invention, the disc is closed by recording latest information in the TDMA, that is, latest TDDS, TDFL and SRRI information, into the DMAs (DMA1 to DMA4) of the Lead-out area and the Lead-out area without forcedly changing the unrecorded area to the recorded area. Although not shown in FIG. 7B, an indicator indicating that the disc is closed can be included in the TDMA0.

The disc closing method shown in FIG. 7B is suitable for the old version disc 100a shown in FIG. 1. That is, since the old version disc 100a maintains the compatibility with the new version recording/reproducing apparatus 10b, the method according to the first embodiment may be used. The disc closing method shown in FIG. 7B is not suitable for the new version disc 100b shown in FIG. 1. That is, when the new version disc 100b uses the method according to the first embodiment, the old version recording/reproducing apparatus 10a does not recognize the data on the disc and thus an error occurs. That is, the backward compatibility is not maintained.

Hereinafter, a disc closing method which is capable of allowing the new version disc 100b to maintain the backward compatibility with the old version recording/reproducing apparatus 10a will be described with reference to FIGS. 8A to 10B.

FIGS. 8A and 8B are diagrams illustrating a second embodiment of the method of closing the recording medium according to the present invention. For convenience of description, FIG. 8A shows a disc state before closing and FIG. 8B shows a disc state after closing.

For convenience of description, FIG. 8A shows the same disc state as that shown in FIG. 7A. That is, the TDMA is not allocated in the ISA and the OSA, the SRR #1 and SRR #2 are allocated in the user data area, and the last LRA (A) of the disc is the last position including user data in the SRR #2.

FIG. 8B shows the disc state after closing the disc according to the second embodiment of the present invention. That is, according to the second embodiment of the present invention, the disc is closed by forcedly changing the unrecorded area to the recorded area and recording latest information in the TDMA, that is, latest TDDS, TDFL and SRRI information, into the DMAs (DMA1 to DMA4) of the Lead-out area and the Lead-out area. Although not shown in FIG. 8B, an indicator indicating that the disc is closed can be included in the TDMA0.

The disc closing method shown in FIG. 8B is suitable for the new version disc 100*b* shown in FIG. 1. That is, all the unrecorded areas need to be changed to the recorded areas such that the new version disc 100*b* maintains the backward compatibility with the old version recording/reproducing apparatus 10*a*. The disc closing method shown in FIG. 8B is applicable to the old version disc 100*a* shown in FIG. 1. Since the data is no longer recorded in the disc at the time of closing the disc, all the unrecorded areas in the disc may be changed to the recorded areas. That is, the old version disc 100*a* shown in FIG. 1 may use both the disc closing method shown in FIG. 7B and the disc closing method shown in FIG. 8B.

FIGS. 9A and 9B are diagrams illustrating a third embodiment of the method of closing the recording medium according to the present invention. For convenience of description, FIG. 9A shows a disc state before closing and FIG. 9B shows a disc state after closing.

For convenience of description, FIG. 9A shows the same disc state as that shown in FIG. 7A. That is, the TDMA is not allocated in the ISA and the OSA, the SRR #1 and SRR #2 are allocated in the user data area, and the last LRA (A) of the disc is the last position including user data in the SRR #2.

FIG. 9B shows the disc state after closing the disc according to the third embodiment of the present invention. That is, according to the third embodiment of the present invention, the disc is closed by forcedly changing the unrecorded area to the recorded area, recording latest information in the TDMA, that is, latest TDDS, TDFL and SRRI information, into the DMAs (DMA1 to DMA4) of the Lead-out area and the Lead-out area, and recording specific recognition information next to the last LRA (A) of the disc. For example, the guard area may be formed at the last LRA (A) and the recognition information may be recorded in the guard area. The recognition information may be used for identifying the last user data point (A) in the recording medium. The recognition information may be specific valid data recorded in the guard area or the dummy data recorded in the guard area. Although not shown in FIG. 9B, an indicator indicating that the disc is closed can be included in the TDMA0.

When the existence of the guard area is recognized, the old version recording/reproducing apparatus 10*a* efficiently reproduces only the data before the guard area while ignoring the data after the guard area. Accordingly, the old version recording/reproducing apparatus 10*a* can reproduce data from the new version disc 100*b* with compatibility. The existence of the guard area can be checked by checking the SRR entry shown in FIGS. 11*b* and 11*d* to be described later.

The disc closing method according to the third embodiment of the present invention may be particularly used when a closing time is desired to be reduced. That is, all the unrecorded areas need to be changed to the recorded areas such that the new version disc 100*b* maintains the backward compatibility with the old version recording/reproducing apparatus 10*a*. However, since it takes much time to change the unrecorded areas in which the valid data is not included to the recorded areas, only the unrecorded areas before the last LRA (A) of the disc are changed to the recorded areas and the guard area is formed at the last LRA (A) of the disc. Accordingly, when the old version recording/reproducing apparatus 10*a* reproduces the data from the new version disc 100*b*, only the data before the guard area is efficiently recognized and reproduced. When the disc is closed according to the present embodiment, information does not need to be recorded in the DMAs (DMA3 and DMA4 in the Lead-out area) located after the guard area. Accordingly, in the disc which is closed according to the present embodiment, only the DMAs (DMA1 and DMA2) in the Lead-in area are used.

Figure 10A:
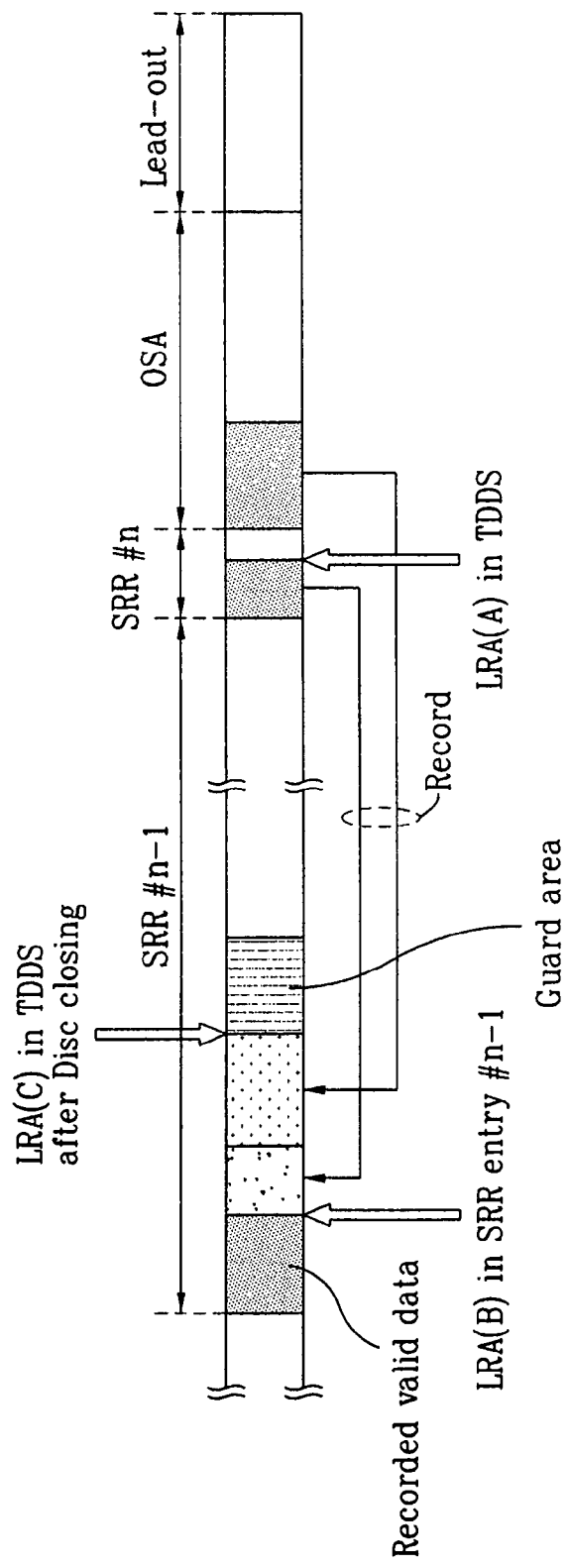
FIGS. 10A and 10B are diagrams illustrating a fourth embodiment of the method of closing the recording medium according to the present invention.
Figure 10B:
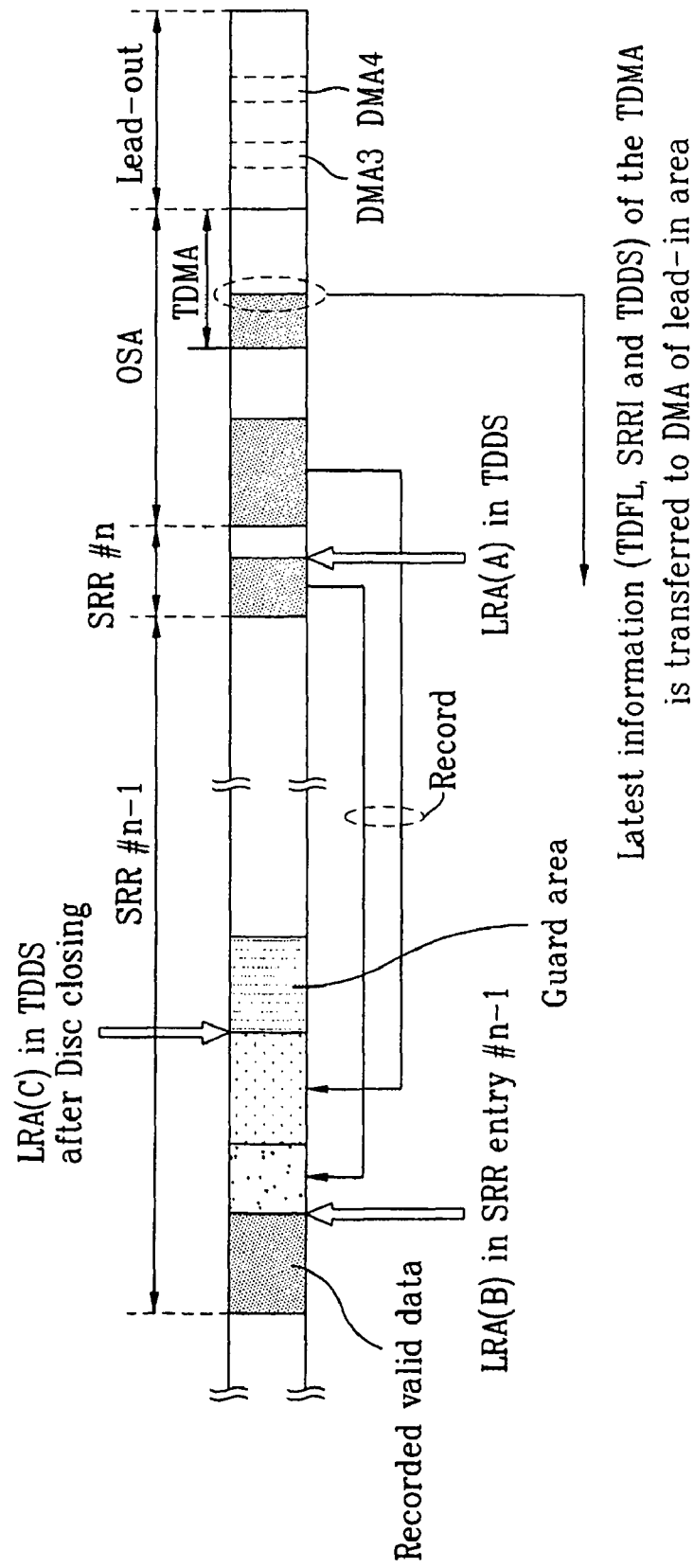

FIGS. 10A and 10B are diagrams illustrating one embodiment according to a fourth embodiment of the method of closing the recording medium according to the present invention. FIGS. 10A and 10B correspond to a modified use of the method of closing the disc according to the third embodiment (FIG. 9B) of the present invention.

That is, while all the unrecorded areas before the last LRA (A) of the disc are changed to the recorded areas in the third embodiment (FIG. 9B), a position in which the recognition information is to be recorded is determined in the forth embodiment of the present invention.

Valid data located after the determined position is transferred to unrecorded area(s), in the user data area, located before the determined position. More particularly, the valid data located after the determined position is consecutively recorded in unrecorded area(s) of open SRR(s) before the disc closing. Dummy data may be filled up in an unrecorded area in a SRR already closed before the disc and an unrecorded area remained after the transferring during the disc closing. Moreover, the fourth embodiment of the present invention provides a method of transferring the valid data located after the determined position by using a logical overwrite (hereinafter, referred to as "LOW"). Information on the transferring is recorded in the management area of the recording medium by the same method as a method of managing a defective area.

Hereinafter, one embodiment according to the fourth embodiment of the present invention will be described in detail with reference to FIGS. 10A and 10B.

FIGS. 10A and 10B show a disc state after closing the disc according to the fourth embodiment of the present invention.

In FIG. 10A, it is assumed that a SRR located at an outermost circumference of the user data area is the SRR #n and a just previous SRR thereof is a SRR #(n−1). In addition, it is assumed that data for defect management is included in the OSA after SRR #n.

In the above-described disc state, when the disc is desired to be closed, the LRA (A) in the SRR #n and the LRA (B) in the SRR #(n−1) are compared with each other to select a SRR where the guard area will be formed. For example, if the size of the unrecorded area between the LRA (A) and the LRA (B) is larger than a reference value (for example, L clusters), the guard area is formed in the SRR #(n−1) in which the LRA (B) is included. If the size of the unrecorded area between the LRA (A) and the LRA (B) is smaller than the reference value (for example, L clusters), the guard area is formed in the SRR #n in which the last LRA (A) is included. Accordingly, it is possible to reduce the time consumed for changing the unrecorded area in the disc to the recorded area. Therefore, it is preferable that the reference value (for example, L clusters) is freely set in each system in consideration of the time consumption. The term "cluster" is indicative of a recording unit in the disc and more particularly a minimum recording unit to which an error correction code (ECC) is applied in the BD-R.

In the fourth embodiment of the present invention, the SRR in which guard area will be formed may be variously decided depending on the system, which is a modified embodiment of the present invention. Instead of the comparison between the LRA (A) and the LRA (B), the size a of the unrecorded area in the SRR #(n−1) and the size b of the recorded area in the SRR #n are compared with each other to decide a SRR in which the guard area will be formed. That is, a size from the LRA (B) of the SRR #(n−1) to the start address of the SRR #n corresponds to the size (a) of the recorded area in the SRR #(n−1) and a size from the start address of the SRR #n to the LRA (A) of the SRR #n corresponds to the size (b) of the recorded area in the SRR #n. Accordingly, when a difference between the size (a) of the unrecorded area in the SRR #(n−1) and the size (b) of the recorded area in the SRR #n is larger than a reference value, the guard area is formed in the SRR #(n−1) and, when the difference is smaller than the reference value, the guard area is formed in the SRR #n.

If it is determined that the guard area is formed in the SRR #(n−1) in which the LRA (B) is included, the valid data recorded in the OSA and the SRR #n is transferred (recorded) next to the LRA (B). Next, the above-described guard area is formed after the transferred data. Accordingly, the valid data located after the guard area needs to be transferred before forming the guard area. For example, in the BD-R, the transferring is performed by the above-described LOW and information on the LOW (that is, original position information and transferred position information) is recorded in the TDFL by the same method as a method of managing a defective area.

When the disc closing is completed, the position of the last valid data replaced by the LOW is a new last (final) LRA (C) of the disc. That is, the guard area will be formed next to the LRA (C).

Although not shown in FIG. 10A, if it is determined that the guard area is formed in the SRR #n or the SRR #(n−1), it is apparent that the valid data in the OSA must be transferred in the SRR #n or the SRR #(n−1) before forming the guard area. In this case, if the unrecorded area in the SRR #n or the SRR #(n−1) is not enough to record the valid data recorded in the OSA, it is preferable that the guard area is formed in the OSA.

FIG. 10B shows a case where the TDMA is, for example, allocated in the OSA in the same state as that of FIG. 10A. That is, all the valid data after the SRR in which the guard area will be formed must be transferred to a previous area of the guard area by the LOW. However, since the valid data recorded in the TDMA is transferred to the DMA when closing the disc, the valid data recorded in the TDMA does not need to be recorded in the previous area of the guard area. That is, latest information in the TDMA is transferred to and recorded in the DMA when closing the disc.

Besides, although not shown in FIGS. 10A and 10B, the valid data located after the SRR #n or the SRR #(n−1) may be transferred to another open SRR before the SRR #(n−1).

The fourth embodiment (FIGS. 10A and 10B) of the present invention may be particularly used in the following cases. In a specific optical disc, such as the new version disc 100b shown in FIG. 1, a recording range (for example, the SRR #n) may be allocated in the outermost circumference of the user data area and file system information may be recorded in the recording range. In this case, the SRR #n located at the outermost circumference and the just previous SRR #(n−1) thereof are physically separated from each other. Although the disc is closed in such physical structure, although the second embodiment (FIG. 8B) or the third embodiment (FIG. 9B) of the present invention is applied, the whole unrecorded area between the SRR #n and the SRRB (n−1) must be changed to the recorded area and thus the closing time increases. That is, in the fourth embodiment of the present invention, it is possible to reduce the closing time while maintaining the backward compatibility.

Figure 10C:
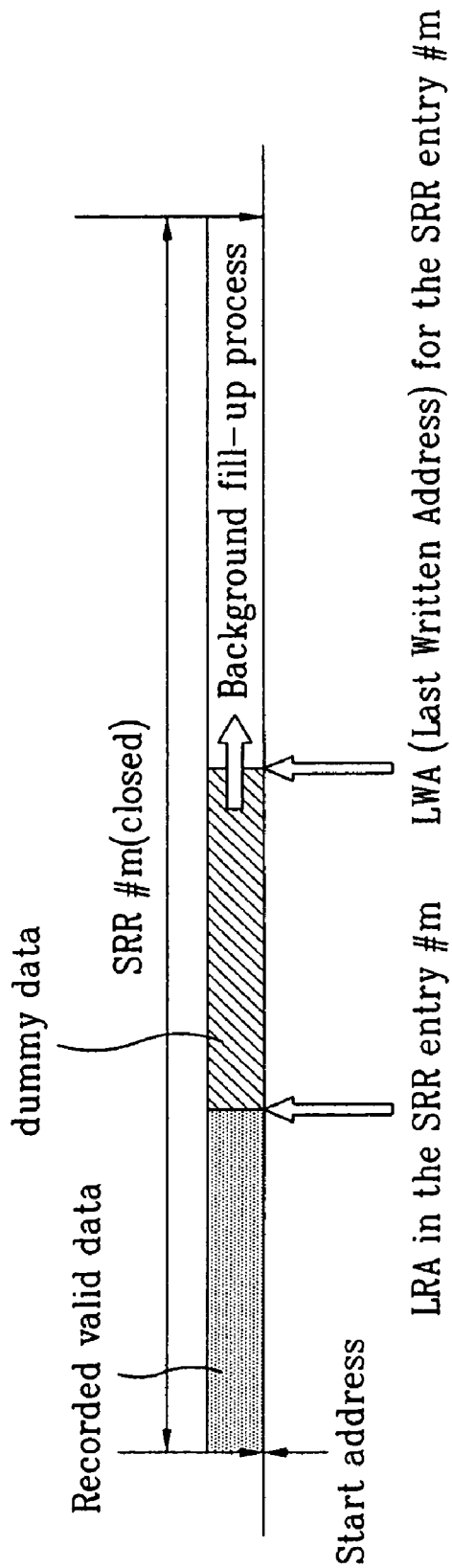
FIG. 10C is a diagram illustrating a fifth embodiment of the method of closing the recording medium according to the present invention.

FIG. 10C is a diagram illustrating a fifth embodiment of the method of closing the recording medium according to the present invention. FIG. 10C shows the method of closing the recording medium using the method of closing the SRR.

When closing the recording medium, all the SRRs in the recording medium must be closed. For example, in FIGS. 8b, 9b and 10a, the unrecorded area in the closed SRR needs to be changed to the recorded area. It takes much time to simultaneously change the whole unrecorded area in the recording medium to the recorded area. FIG. 10C shows the method for solving the problem that it takes much time to close the recording medium. FIG. 10C shows one closed SRR. Hereinafter, the method of changing a SRR #m to a closed SRR will be described in detail with reference to FIG. 10C.

FIG. 10C is a diagram illustrating a method of changing an unrecorded area in the closed SRR to a recorded area in an idle state that the recording/reproducing apparatus does not perform a special function, rather than changing the whole unrecorded area in the recording medium to the recorded area, when closing the recording medium. Hereinafter, for convenience of description, the method shown in FIG. 10C is referred to as the "background close".

For example, it is assumed that the valid data is recorded in an area from a start address to an LRA of the SRR #m and the remaining area is in an unrecorded state. When a variety of causes for closing the SRR #m (a case where an upper-level session is closed or only a corresponding SRR is closed) occurs in such state, the recording/reproducing apparatus records dummy data after the LRA of the closed SRR to perform the background close in the idle state that the recording/reproducing apparatus has not performed the special function, without immediately changing the unrecorded area of the SRR #m to the recorded area. When an interruption signal occurs during performing the background close, the background close is stopped and an operation (for example, a recording or reproducing operation) corresponding to the interruption signal is performed.

According to the present invention, it is possible to reduce the closing time of the recording medium by performing the background close with respect to the closed SRR before closing the recording medium. If all the unrecorded areas in the closed SRRs are, for example, changed to the recorded areas using the background close, the closing of the recording medium is finished by changing only the unrecorded area in the open SRR to the recorded area when actually closing the recording medium.

The position in which the background close stops is defined by additional management information such as last written address (LWA) information and stored in a memory (reference numeral 15 of FIG. 12) in the recording/reproducing apparatus. When the background close is performed again, the background close resumes at the stored LWA. Information on the background close may be set in the SRR entry and will be described in detail later with reference to FIGS. 11c and 11D.

Figure 11A:
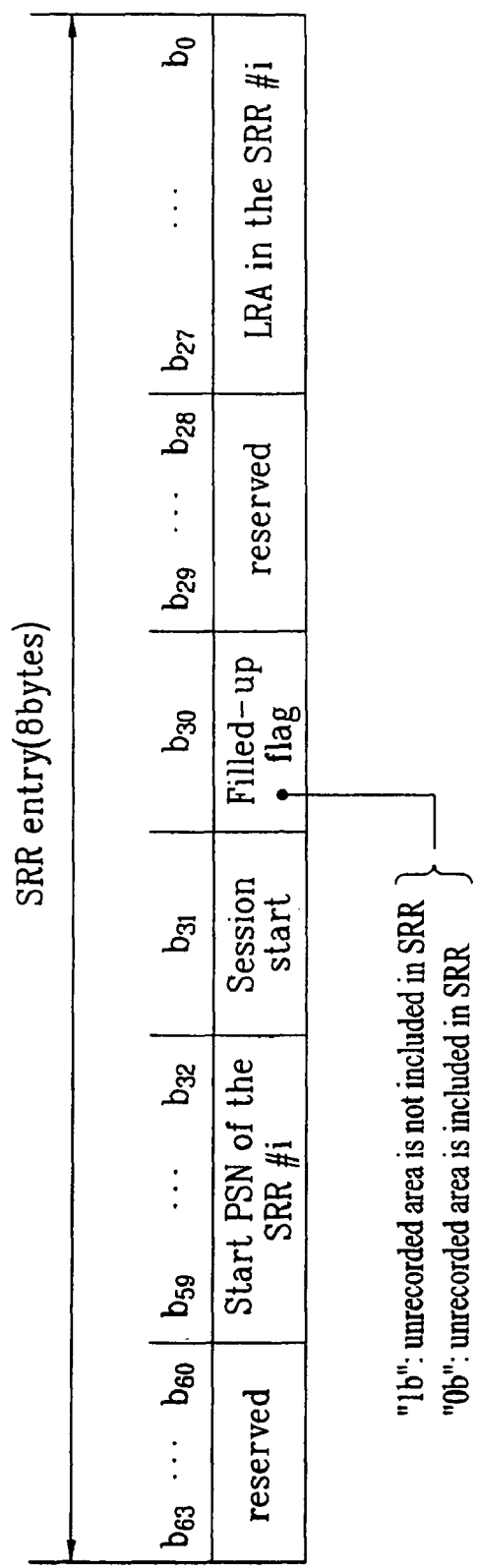
FIGS. 11A-11D are diagrams illustrating a method of recording management information according to the present invention.
Figure 11B:
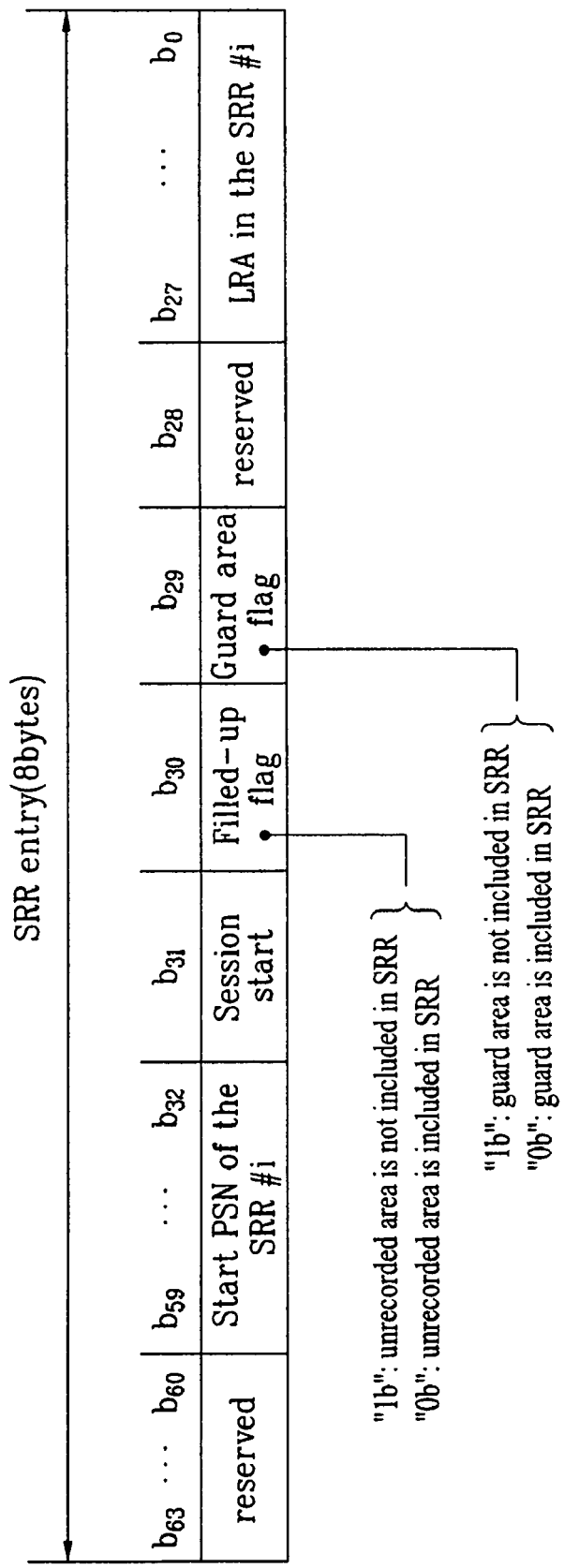
Figure 11C:
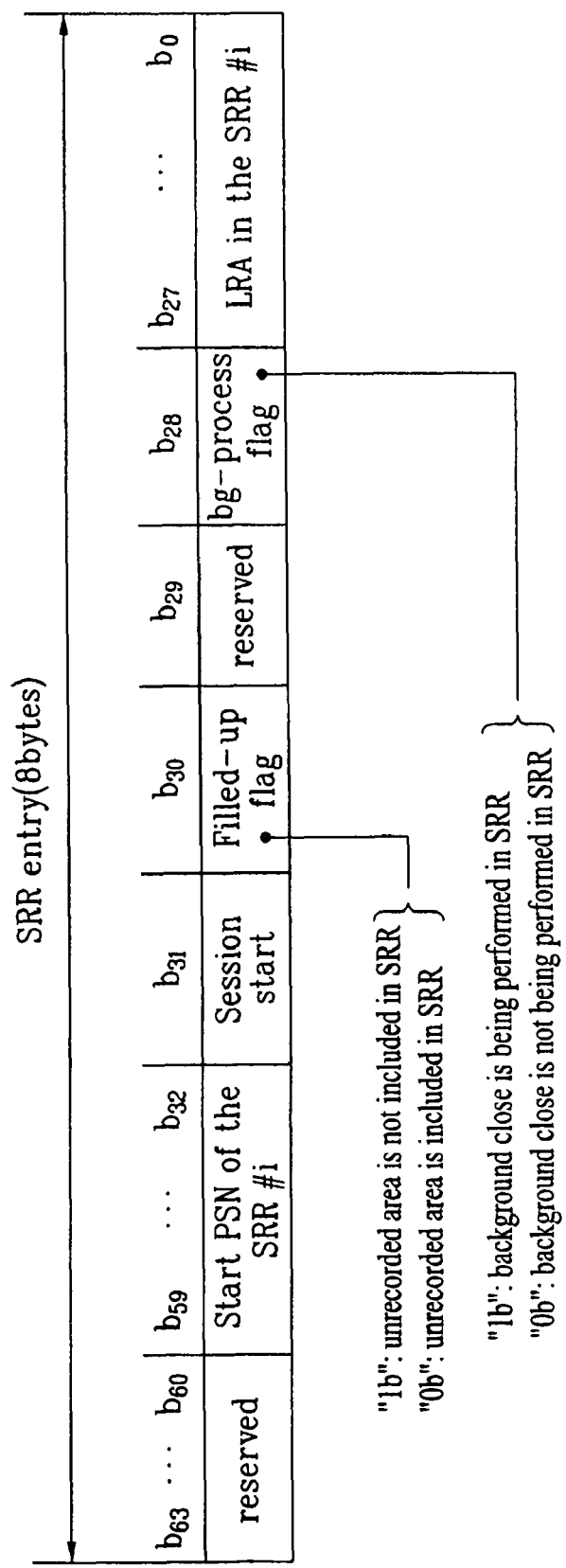
Figure 11D:
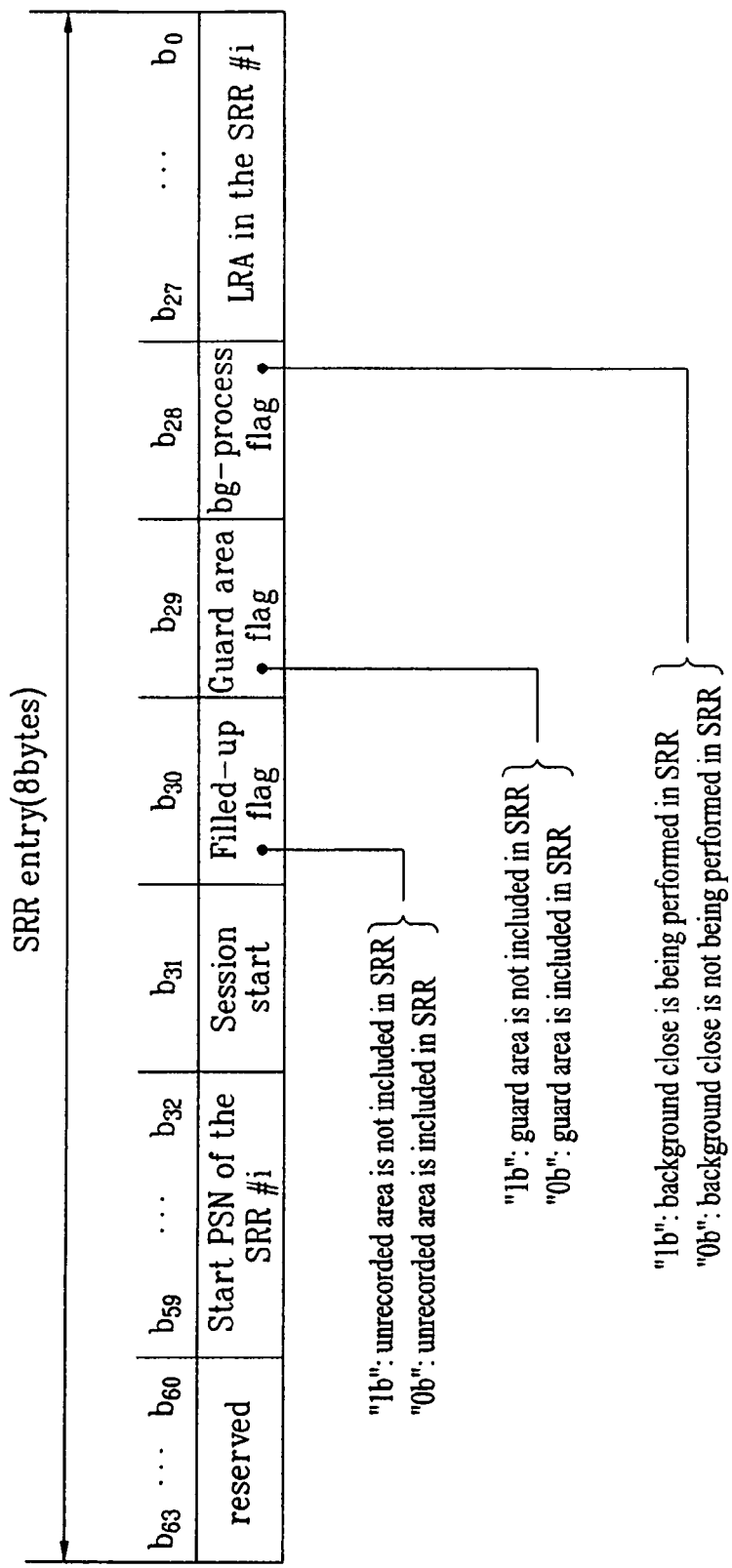

FIGS. 11A and 11D show examples of recording management information according to the present invention, that is, the structure of the SRR entry in the above-described SRRI.

FIG. 11A shows an example of the structure of the SRR entry according to the present invention. One SRR entry is information one-to-one corresponding to a specific SRR formed in the user data area. The SRR entry has a total of 8 bytes and has the following information indicating status of the SRR. For example, a field "Start PSN of the SRR #i" indicates a start address of the SRR and has a physical sector number (PSN). A field "LRA in the SRR #i" indicates the position of user data which is lastly recorded in the SRR and has the PSN. Flag information "Session start" having 1 bit indicates whether the SRR is a start SRR of a specific session. Information "Filled-up flag" indicates whether an unrecorded area is included in the SRR. That is, if "Filled-up flag=1b", it indicates that the unrecorded area is not included in the SRR, and, if "Filled-up flag=0b", it indicates that the unrecorded area is included in the SRR.

The information "Filled-up flag" can be used in the second embodiment (FIG. 8B), the third embodiment (FIG. 9B), the fourth embodiment (FIGS. 10A and 10B) and the fifth embodiment (FIG. 10C) of the method of closing the disc according to the present invention. That is, when the unrecorded area in the SRR must be changed to the recorded area, an operation for changing the unrecorded area in the SRR to the recorded area is performed by checking the information "Filled-up flag". The open SRR always has the information "Filled-up flag=0b" indicating that the unrecorded area is included. In contrast, in the closed SRR, the information "Filled-up flag" is set to "0b" or "1b" depending on the existence of the unrecorded area. In particular, if the method of changing the unrecorded area to the recorded area when the open SRR is changed to the closed SRR is optionally defined according to the recording/reproducing apparatus in the optical disc standard, the information "Filled-up flag" is used as information indicating the closed SRR which needs to be changed from the unrecorded area to the recorded area.

In particular, when the background close described with reference to FIG. 10C is desired to be performed, the recording/reproducing apparatus finds a SRR, in which the unrecorded area is included, in the closed SRRs having "Filled-up flag=1b" in the SRR entry and performs the background close. When the background close is finished and thus the unrecorded area in the SRR is changed to the recorded area, it indicates that the unrecorded area does not remain by setting the information "Filled-up flag" to "0b".

FIG. 11B shows another example of the structure of the SRR entry according to the present invention, in which the field "Start PSN of the SRR #i", the field "LRA in the SRR #i", the flag information "Session start" and the information "Filled-up flag" are equal to those of FIG. 11A. The example shown in FIG. 11B further includes information "Guard area flag", which indicates whether the guard area is included in the SRR. That is, if "Guard area flag=0b", it indicates that the guard area is included in the SRR, and, if "Guard area flag=1b", it indicates that the guard area is not included in the SRR. Accordingly, the information "Guard area flag" may be used for identifying a last recording range including valid user data in the recording medium.

The information "Guard area flag" can be used in the third embodiment (FIG. 9B) and the fourth embodiment (FIGS. 10A and 10B) of the method of closing the disc according to the present invention, which is related to the formation of the guard area. That is, when the guard area is formed in a specific SRR at the time of closing the disc, the information "Guard area flag" in the SRR entry is set to "0b" such that, when a disc is inserted into the recording/reproducing apparatus, the recording/reproducing apparatus can easily check the position of the SRR, in which the guard area is formed, in the inserted disc by checking the latest SRR entry recorded in the DMA. Accordingly, it is possible to efficiently reproduce only data located before the checked guard area.

The information "Filled-up flag" may be referred to as first identification information and the information "Guard area flag" may be referred to as second identification information. In this case, the recording/reproducing apparatus can efficiently change the unrecorded area to the recorded area when closing the disc, using the first identification information "Filled-up flag" and can check the position of the last valid data recorded in the disc after closing the disc, using the second identification information "Guard area flag".

FIG. 11C shows another example of the structure of the SRR entry according to the present invention, in which the field "Start PSN of the SRR #i", the field "LRA in the SRR #i", the flag information "Session start" and the information "Filled-up flag" are equal to those of FIG. 11A. The example shown in FIG. 11C further includes information "bg-process flag", which indicates whether the background close described with reference to FIG. 10C is being performed in the SRR or not. That is, if "bg-process flag=1b", it indicates that the background close is being performed in the SRR, and, if "bg-process flag=0b", it indicates that the background close is not performed in the SRR.

The field "bg-process flag" is used in the fifth embodiment (FIG. 10C) of the method of closing the disc according to the present invention, which is related to the background close. When the background close is interrupted in a specific closed SRR, the information "bg-process flag" is set to "1b" such that it indicates that the background close is being performed in the SRR. Thereafter, when the recording medium is inserted into another recording/reproducing apparatus, the SRR in which the background close is being performed can be easily checked by checking the SRR entry information in the SRRI.

FIG. 11D shows another example of the structure of the SRR entry according to the present invention. The example shown in FIG. 11D is characterized in that all the information "Filled-up flag", the information "Guard area flag" and the information "bg-process flag" shown in FIGS. 11*a* and 11*c* are set in the SRR entry. The meanings of the flag information are described above and thus the detailed description thereof will be omitted.

Figure 12:
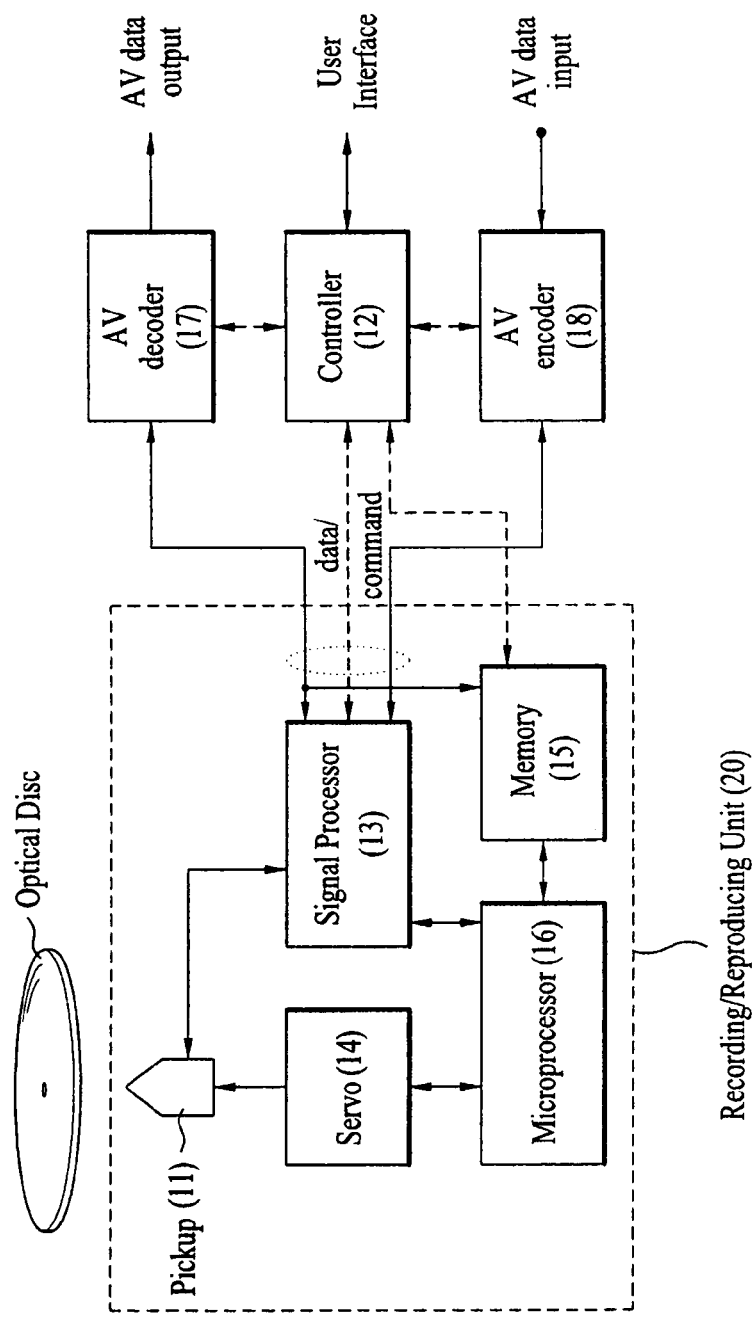
FIG. 12 is a diagram showing an apparatus for recording data on a recording medium according to the present invention.

FIG. 12 is a diagram showing a recording/reproducing apparatus according to the present invention. The recording/reproducing apparatus according to the present invention includes a recording/reproducing unit 20 for recording/reproducing data on/from an optical disc and a controller 12 for controlling the recording/reproducing unit 20. The recording/reproducing apparatus shown in FIG. 12 may be the recording/reproducing apparatus 10*a* or 10*b* shown in FIG. 1.

The recording/reproducing unit 20 includes a pickup unit 11 for directly recording/reading data on/from the optical disc, a signal processor 13 for receiving a signal read from the pickup unit 11, restoring the received signal to a desired signal value, or modulating a signal to be recorded into another signal recorded in the optical disc such that it transmits the recovered or modulated result, a servo unit 14 for controlling the pickup unit 11 so as to accurately read a signal from the optical disc and accurately record a signal on the optical disc, a memory 15 for temporarily storing management information including defect management information and data, and a microprocessor 16 for controlling overall operations of the above-mentioned components. The recording/reproducing apparatus including only the recording/reproducing unit 20 is also referred to as a "driver" and is used as a peripheral device of a computer.

From the viewpoint of reproduction, the recording/reproducing unit 20 reads data from the optical disc 30 and provides the data to a decoder, under the control of a controller 12. That is, the recording/reproducing unit 20 acts as the reproducing unit (reader) for reading the data from the viewpoint of the reproduction. The recording/reproducing unit 20 acts as a recording unit for receiving a signal encoded by an AV encoder 18 and recording data in the optical disc 30. It is apparent that the recording/reproducing apparatus including only the recording/reproducing unit 20 is a drive which can be mounted in the computer.

The controller 12 controls the overall components contained in the recording/reproducing apparatus and transmits a recording/reproducing command for recording/reproducing data on/from the optical disc to the recording/reproducing unit 20 via an interface with the user on the basis of a user command. The controller 12 may also communicate with an external server by a user command.

The controller 12 and the microprocessor 16 are separately operated. Alternatively, the functions of the controller 12 and the microprocessor 16 may be combined and operated as a single control unit. Hereinafter, the controller 12 and the microprocessor 16 are described as the control unit. The control unit may be implemented by a program (software) and/or hardware included in the recording/reproducing apparatus.

The decoder 17 decodes the signal read from the optical disc, restores the received signal to desired information, and provides the decoded result to the user, under the control of the controller.

The encoder 18 converts an input signal into a specific format signal (e.g., an MPEG2 transport-stream) and transmits the converted result to the signal processor 13, under the control of the controller, such that it can record a desired signal on the optical disc.

Hereinafter, a method of recording/reproducing data on/from a recording medium using the recording/reproducing apparatus, a method of recording management information and a method of closing the recording medium according to the present invention will be described in detail with reference to FIGS. 13a and 13b, FIGS. 14a to 14c and FIG. 15.

Figure 13A:
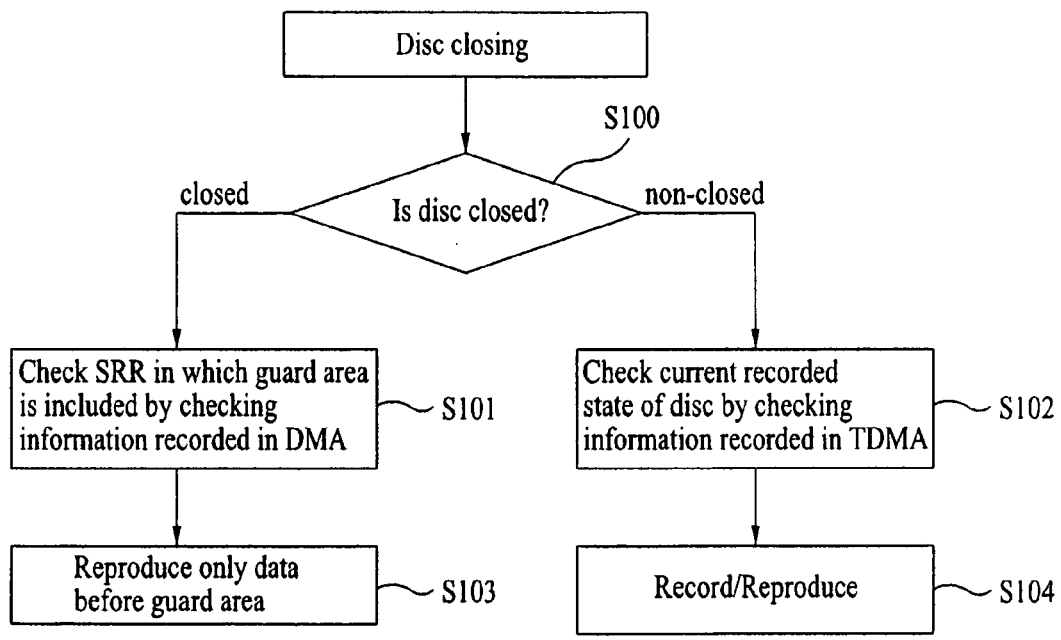
FIG. 13A is a flowchart illustrating a method of recording/reproducing data on/from a recording medium according to the present invention.

FIG. 13A is a flowchart illustrating the method of recording/reproducing data on/from the recording medium according to the present invention.

When a disc is loaded into the recording/reproducing apparatus, it is checked whether the disc is already closed (S100).

If the disc is already closed, the SRR in which a guard area is included in the disc is checked by checking the management information recorded in the DMA (S101). The step S101 can be performed by checking the SRR entry having "Guard area flag=0b" in the SRR entries recorded in the DMA as described above. Accordingly, the recording/reproducing apparatus reproduces only data recorded before the guard area (S103).

If the disc is not closed, the recorded state of the disc is checked by checking the management information recorded in the TDMA (S102). The step S102 can be performed by checking the open SRR and the closed SRR and the SRR entries in latest SRRI information recorded in the TDMA as described above. Accordingly, the recording/reproducing apparatus records the data recorded at the NWA in the open SRR or reproduces the data from the disc, according to the request of the user (S104).

Figure 13B:
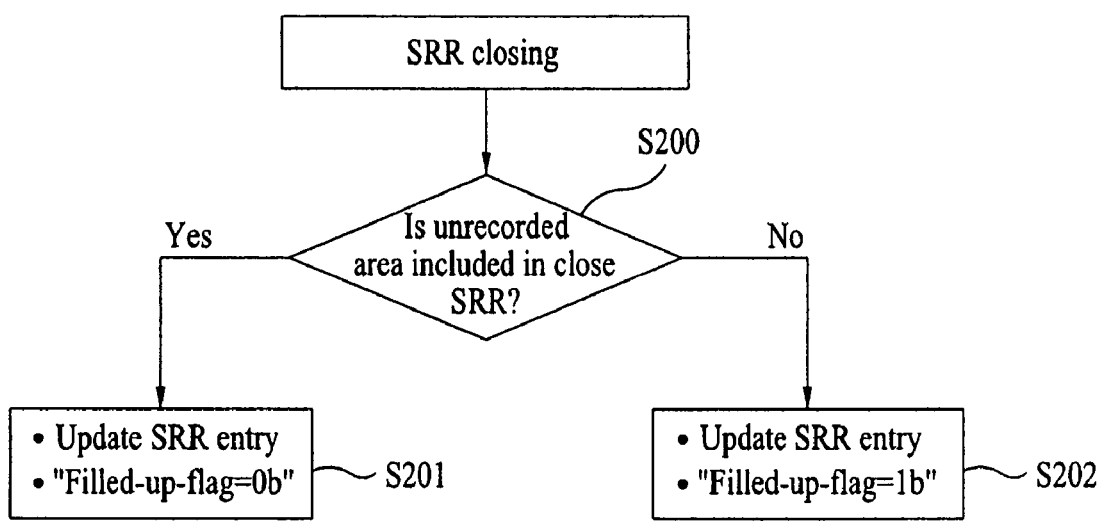
FIG. 13B is a flowchart illustrating an example of a method of recording management information in a recording medium according to the present invention.

FIG. 13B is a flowchart illustrating the method of recording the management information on the recording medium according to the present invention.

When the open SRR is closed during recording/reproducing the disc, it is determined whether an unrecorded area is included in the closed SRR (S200). The step S200 can be performed by comparing an initial size of the SRR with a current size of the SRR. As the result of determination, if the unrecorded area is included after closing the SRR, the information "Filled-up flag" in the SRR entry is set to "0b" such that it indicates that the unrecorded area is included in the closed SRR (S201). If the unrecorded area is not included, the information "Filled-up flag" in the SRR entry is set to "1b" such that it indicates that the unrecorded area is not included in the closed SRR (S202).

By using the information "Filled-up flag", it is possible to change the unrecorded area to the recorded area in only the SRR including the unrecorded area (that is, the SRR having the information "Filled-up flag=0b") when the disc closing command is performed. The background close described with reference to FIG. 10C is applicable to the SRR having the information "Filled-up flag=0b".

Figure 14A:
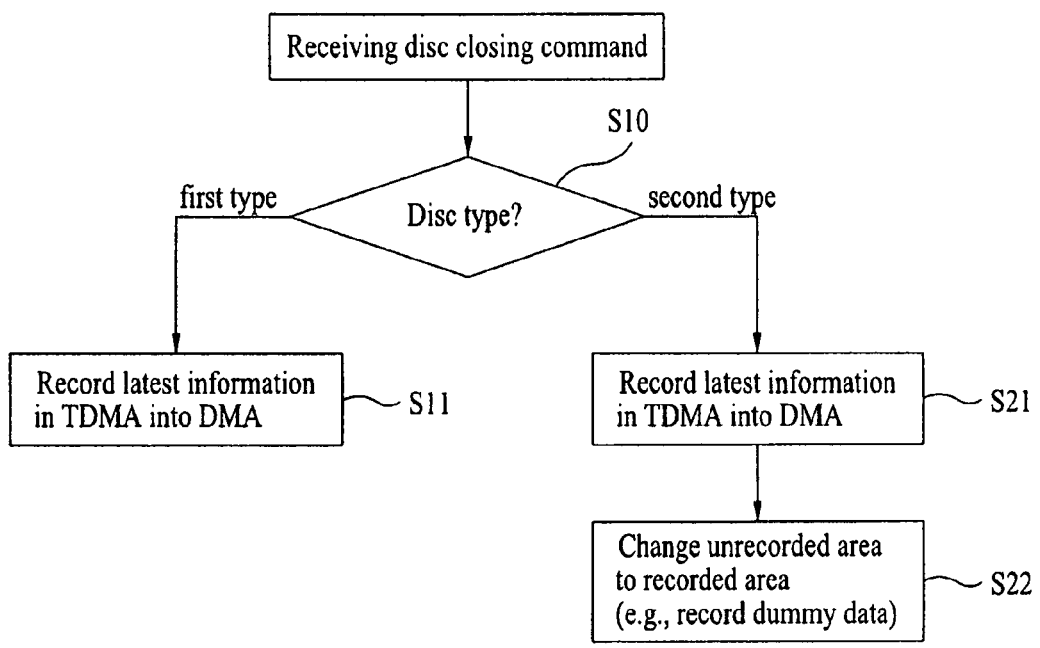
FIGS. 14A-14C are flowcharts illustrating a method of closing a recording medium according to the present invention.
Figure 14B:
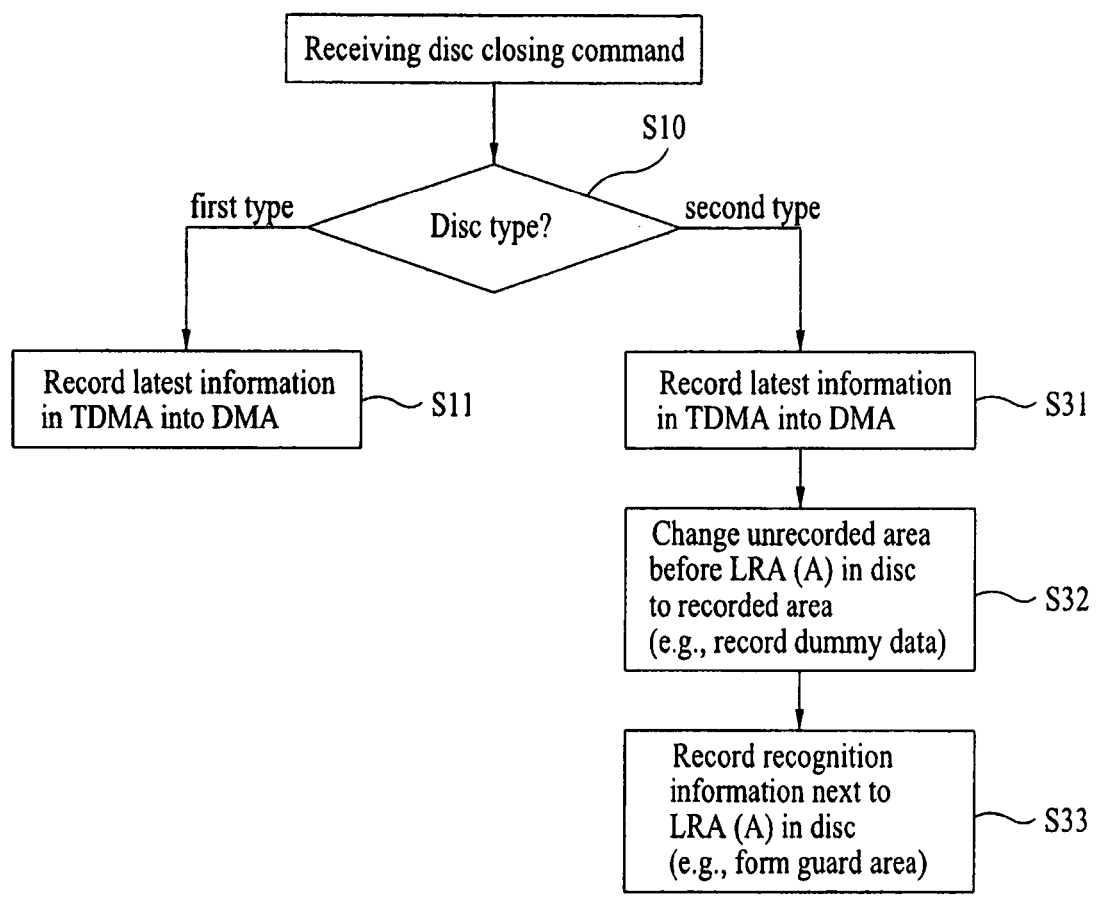
Figure 14C:
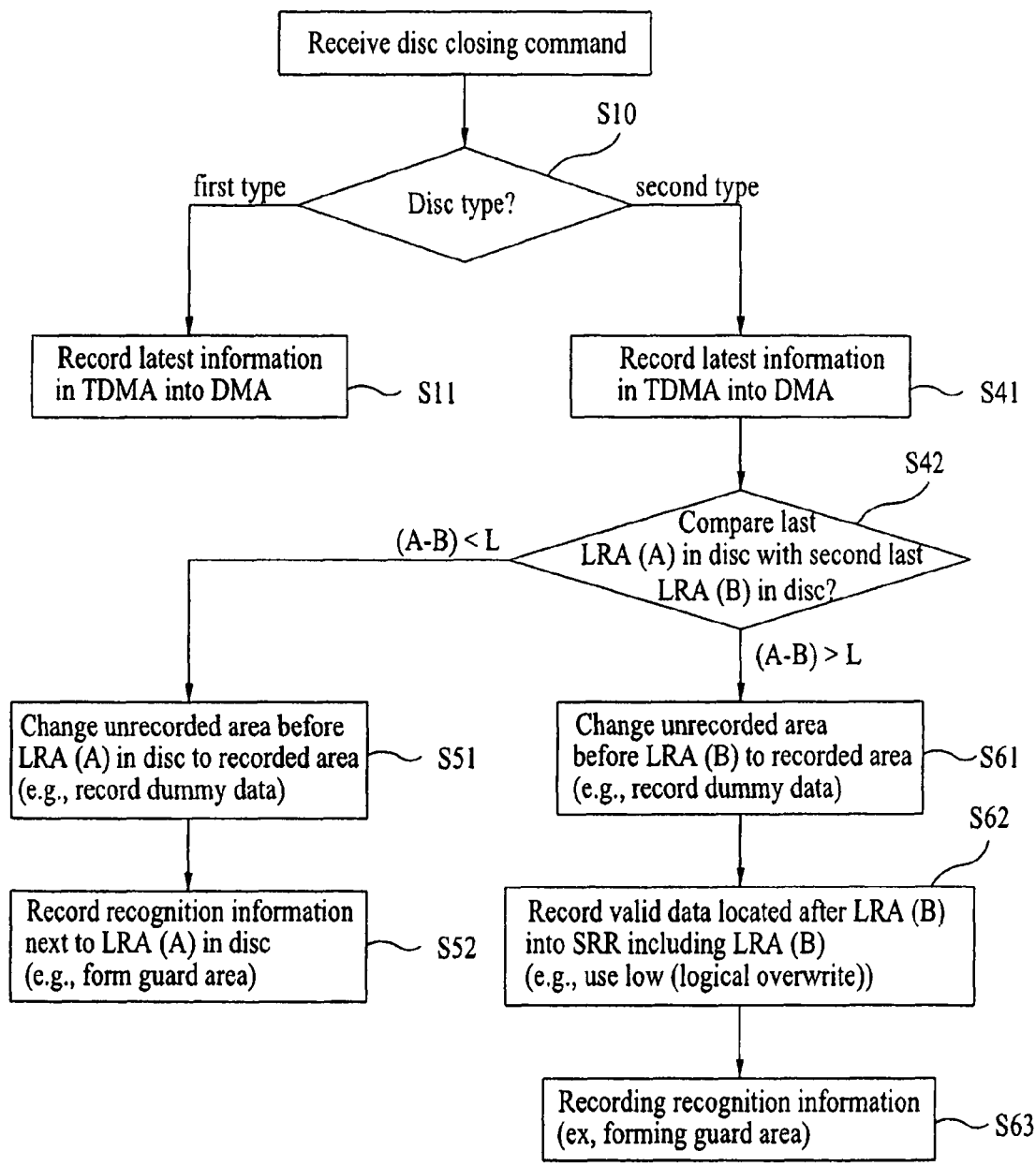

FIGS. 14A to 14C are flowcharts illustrating methods of closing the recording medium according to the present invention.

FIG. 14A shows an example of the method of closing the recording medium according to the present invention, which particularly includes the second embodiment (FIG. 8B).

For example, when a disc closing command is received, it is checked which type of the disc is loaded (S10). The step S10 does not need to be performed when the disc closing command is received and may be performed by checking the management information in the disc just after the disc is loaded. The same is true in FIGS. 14B and 14C.

If the disc is of the first type (e.g., the "H-to-L media" as the old version optical disc 100a shown in FIG. 1), latest information (for example, latest TDDS, TDFL and SRRI) recorded in the TDMA is transferred to the DMA (S11). Thereafter, the disc closing indicator in the TDMA indicates that the disc is closed. The recording/reproducing apparatus may optionally change the unrecorded area in the disc to the recorded area.

If the disc is of the second type (e.g., the "L-to-H media" as the new version optical disc 100b shown in FIG. 1), the latest information (for example, the latest TDDS, TDFL and SRRI) recorded in the TDMA is transferred to the DMA (S21) and all the unrecorded areas in the disc are changed to the recorded areas (S22). The step S22 may be first performed and then the step S21 may be performed. The step S22 of changing the unrecorded area to the recorded area is performed by recording dummy data in the unrecorded area to indicate that pits are formed. The disc closing indicator in the TDMA indicates that the disc is closed.

It is apparent that the first and/or second identification information (for example, "Filled-up flag" or "Guard area flag") in the SRR entry are set to predetermined values before the disc is completely closed.

FIG. 14B shows another example of the method of closing the recording medium according to the present invention, which particularly includes the third embodiment (FIG. 9B).

For example, when a disc closing command is received, it is checked which type of the disc is loaded (S10). If the disc is of the first type (e.g., the "H-to-L media" as the old version optical disc 100a shown in FIG. 1), latest information (for example, latest TDDS, TDFL and SRRI) recorded in the TDMA is transferred to the DMA (S11). Thereafter, the disc closing indicator in the TDMA indicates that the disc is closed. The recording/reproducing apparatus may optionally change the unrecorded area in the disc to the recorded area.

If the disc is of the second type (e.g., the "L-to-H media" as the new version optical disc 100b shown in FIG. 1), the latest information (for example, the latest TDDS, TDFL and SRRI) recorded in the TDMA is transferred to the DMA (S31) and all the unrecorded areas located before the last LRA (A) in the disc are changed to the recorded areas. The step S32 of changing the unrecorded areas to the recorded areas is performed by recording dummy data in the unrecorded area to indicate that pits are formed. Then, the recognition information indicating the position of the last valid data is recorded next to the last (final) LRA (A) in the disc (S33). The recognition information is indicative of the formation of the guard area. The order of the steps S31, S32 and S33 may be changed.

It is apparent that the first and/or second identification information (for example, "Filled-up flag" or "Guard area flag") in the SRR entry are set to predetermined values before the disc is completely closed.

FIG. 14C shows another example of the method of closing the recording medium according to the present invention, which particularly includes the fourth embodiment (FIGS. 10A and 10B).

For example, when a disc closing command is received, it is checked which type of the disc is loaded (S10). If the disc is of the first type (e.g., the "H-to-L media" as the old version optical disc 100a shown in FIG. 1), latest information (for example, latest TDDS, TDFL and SRRI) recorded in the TDMA is transferred to the DMA (S11). Thereafter, the disc closing indicator in the TDMA indicates that the disc is closed. The recording/reproducing apparatus may optionally change the unrecorded area in the disc to the recorded area.

If the disc is of the second type (e.g., the "L-to-H media" as the new version optical disc 100b shown in FIG. 1), the latest information (for example, the latest TDDS, TDFL and SRRI) recorded in the TDMA is transferred to the DMA (S41) and the last LRA (A) and the previous LRA (B) (second last LRA (B)) in the disc are compared with each other (S42). The step S42 is to select a SRR in which the guard area will be formed and may be performed by a variety of methods as well as the method of comparing the last LRA (A) and the second last LRA (B), as described above.

If a physical distance between the last LRA (A) and the LRA (B) is smaller than a specific reference value (e.g., L clusters) as the result of comparison, that is, (A-B)<L, all the unrecorded areas located before the last LRA (A) in the disc are changed to the recorded areas (S51) and the recognition information (for example, the formation of the guard area) indicating the disc is closed (S52). The recording/reproducing apparatus can recognize a position up to which valid data to be reproduced is recorded.

If the physical distance between the last LRA (A) and the second last LRA (B) is larger than the specific reference value (e.g., L clusters) that is, (A-B)>L, all the unrecorded areas located before the LRA (B) in the disc are changed to the recorded areas (S61) and the valid data which is located after the LRA (B) is transferred next to the LRA (B) (S62). In the BD-R, the transfer of data is, for example, performed by the LOW. When the transfer in the step S62 is finished, the recognition information (for example, the formation of the guard area) indicating the disc is closed (S63). The recording/reproducing apparatus can recognize a position up to which valid data to be reproduced is recorded. The order of the steps S61 and S62 may be changed.

Figure 15:
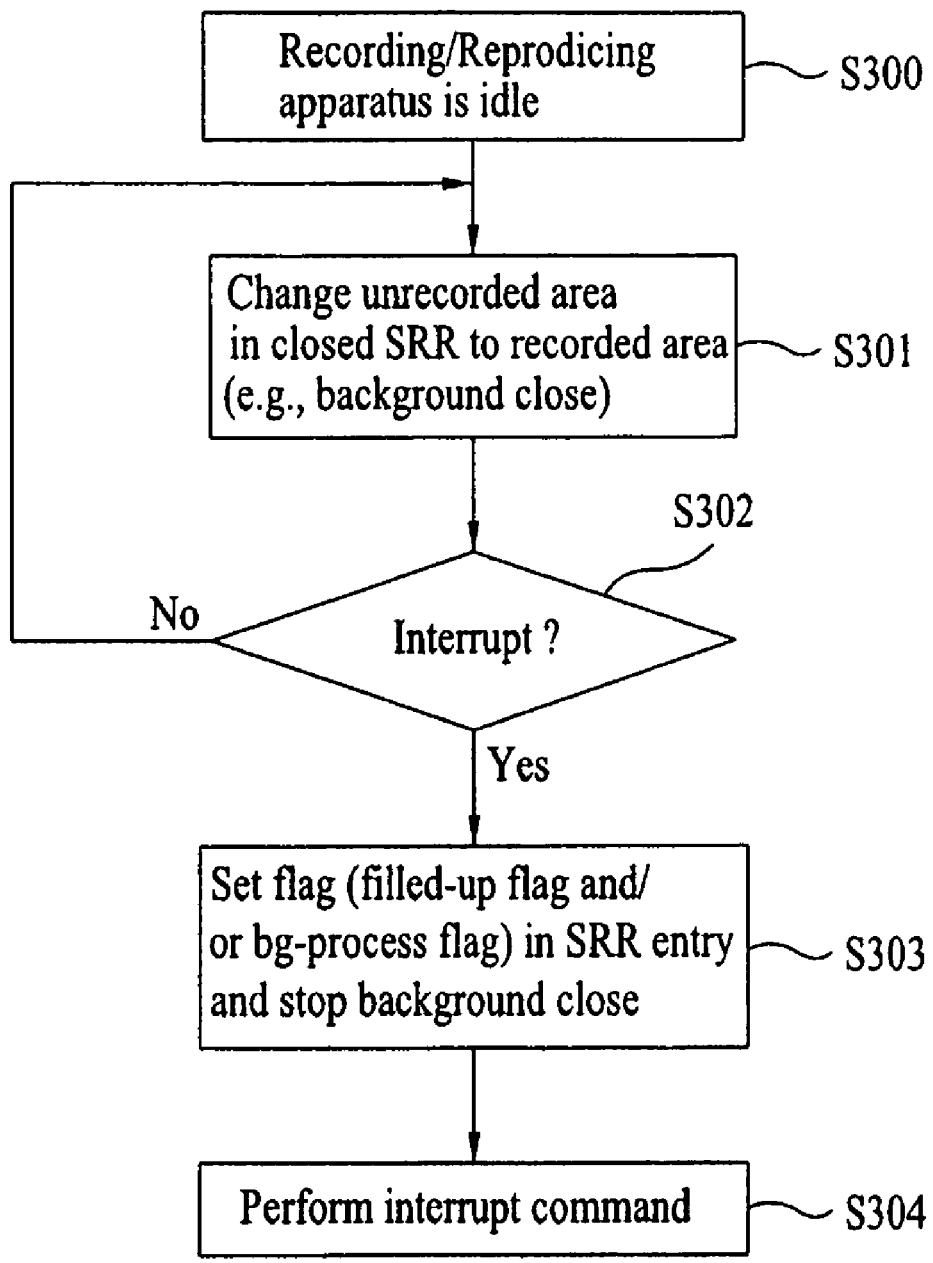
FIG. 15 is a flowchart illustrating another example of the method of recording/reproducing data on/from a recording medium according to the present invention.

FIG. 15 shows another example of the method of recording/reproducing data on/from the recording medium according to the present invention, which particularly includes the fifth embodiment (FIG. 10C).

For example, if the recording/reproducing apparatus is idle (S300), it is checked whether an SRR having the unrecorded area is included in the closed SRRs. The checking is performed from the SRRI. The background close, for example, starts at a leading SRR in the closed SRRs having the information "Filled-up flag=1b" (S301). The dummy data may be recorded in the unrecorded area.

The step S301 is repeatedly performed until an interruption occurs by the system. That is, when the background close is finished at a specific SRR, the background close may is performed at a closed SRR, having the information "Filled-up flag=1b", next to the specific SRR.

When the interruption occurs by the system (S302), the background close is stopped and the information ("Filled-up flag" and/or "bg-process flag") in the SRR entry is properly set (S303). The meanings of the information and recording methods are described with reference to FIGS. 11A and 11C. In addition, as shown in FIG. 10C, the LWA needs to be stored in the memory 15. Thereafter, a command (for example, record or reproduction) corresponding to the interruption is performed (S304). When the command (for example, record or reproduction) is finished and the recording/reproducing apparatus is idle again (S300), the background close resumes in the step S301.

The step S303 of setting the management information in the SRR entry does not need to be performed before the step S304. For example, if only the LWA indicating the position in which the background close stops is stored, the process may resume at the step S300. If the command corresponding to the interruption is a command for ejecting the disc from the recording/reproducing apparatus, the information is necessarily set in the SRR entry like the step S303 and the command (for example, the ejecting command) is performed.

If the command corresponding to the interruption is a command for closing the recording medium, the recording medium is closed by any one of the methods shown in FIGS. 14A, 14B and 14C.

It is apparent that the methods related to the recording medium described with reference to FIGS. 7A to 15 may be used even when a session in the recording medium is closed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

According to a recording medium, a method and apparatus for recording/reproducing data on/from the recording medium and a method of recording management information on the recording medium of the present invention, it is possible to reproduce recording media having different versions with compatibility. In addition, it is possible to reduce a time consumed for closing the recording medium.

The invention claimed is:

1. A method of closing a recording range allocated in a user data area on a recording medium, the method comprising:
   identifying a recording medium type from recording medium information of the recording medium; and
   changing an unrecorded area in the recording range to a recorded area in case that the recording medium type indicates that the recorded area has a higher reflectivity than that of the unrecorded area.

2. A method of claim 1, further comprising:
recording an indicator in a management area of the recording medium, the indicator indicating that the recording range does not include the unrecorded area.

3. The method of claim 1, wherein the recording medium type is identified by a push-pull polarity defined in the recording medium information.

4. The method of claim 3, wherein the push-pull polarity of the recording medium is negative set to "1".

5. The method of claim 1, wherein the recording medium type is identified by a recorded mark polarity defined in the recording medium information, wherein the recorded mark polarity is set to "1".

6. The method of claim 1, wherein the unrecorded area in the recording range is optionally changed to a recorded area in case that the recording medium type indicates that the recorded area has a lower reflectivity than that of the unrecorded area.

7. An apparatus for closing a recording range allocated in a user data area on a recording medium, the apparatus comprising:
a pickup unit configured to record/reproduce data on/from the recording medium; and
a control unit configured to control the pickup unit to reproduce recording medium information from the recording medium, identify a recording medium type from the recording medium information and control the pickup unit to change an unrecorded area in the recording range to a recorded area in case that the recording medium type indicates that the recorded area has a higher reflectivity than that of the unrecorded area.

8. The apparatus of claim 7, wherein the control unit is configured to control the pickup unit to record, into a management area of the recording medium, an indicator indicating that the recording range does not include the unrecorded area.

9. The apparatus of claim 7, wherein the control unit is configured to identify the recording medium type by a push-pull polarity defined in the recording medium information.

10. The apparatus of claim 7, wherein the control unit is configured to identify the recording medium as the recording medium type that the recorded area has a higher reflectivity than that of the unrecorded area in case that a push-pull polarity of the recording medium is set to "1".

11. The apparatus of claim 7, wherein the control unit is configured to identify the recording medium as the recording medium type that the recorded area has a higher reflectivity than that of the unrecorded area in case that a recorded mark polarity defined in the recording medium information is set to "1".

12. The apparatus of claim 7, wherein the control unit is configured to control the pickup unit to change optionally the unrecorded area in the recording range to a recorded area in case that the recording medium type indicates that the recorded area has a lower reflectivity than that of the unrecorded area.

13. A recording medium comprising a recording area having:
recording medium information including recording medium type information indicating whether or not a recorded area of the recording medium has a higher reflectivity than that of an unrecorded area of the recording medium, and indication information indicating
a recording range in which all unrecorded areas has been changed into recorded areas when the recording range is closed, in case that the recording medium type information indicates that the recorded area of the recording medium has a higher reflectivity than that of the unrecorded area of the recording medium.

14. The recording medium of claim 13, further comprising:
a management area storing therein an indicator indicating that the recording range does not include an unrecorded area.

15. The recording medium of claim 13, wherein the recording medium type information is a push-pull polarity defined in the recording medium information.

16. The recording medium of claim 15, wherein the push-pull polarity of the recording medium is set to "1" in case that the recording medium type information indicates that the recorded area of the recording medium has a higher reflectivity than that of the unrecorded area of the recording medium.

17. The recording medium of claim 13, wherein the recording medium type information is a recorded mark polarity defined in the recording medium information, wherein the recorded mark polarity is set to "1" in case that the recording medium type information indicates that the recorded area of the recording medium has a higher reflectivity than that of the unrecorded area of the recording medium.

18. The recording medium of claim 13, wherein the recording range includes an unrecorded area after the recording range is closed, in case that the recording medium type indicates that the recorded area has a lower reflectivity than that of the unrecorded area.

* * * * *